United States Patent [19]
Blau et al.

[11] Patent Number: 5,799,153
[45] Date of Patent: Aug. 25, 1998

[54] TELECOMMUNICATION SYSTEM

[75] Inventors: Staffan Blau, Stockholm; Göran Eneroth, Bandhagen; Peter Carlsund, Skärholmen, all of Sweden

[73] Assignee: Telefonaktiebolaget LM Ericsson, Stockholm, Sweden

[21] Appl. No.: 489,732

[22] Filed: Jun. 13, 1995

[30] Foreign Application Priority Data

| Jun. 13, 1994 | [SE] | Sweden | 9402054 |
| Jan. 11, 1995 | [SE] | Sweden | 9500079 |

[51] Int. Cl.$^6$ ............................................. G06F 11/30
[52] U.S. Cl. ............................ 395/200.53; 395/200.3
[58] Field of Search ....................... 395/200.01, 200.11, 395/800, 200.53, 200.3

[56] References Cited

U.S. PATENT DOCUMENTS

| 5,031,211 | 7/1991 | Nagai et al. | 379/221 |
| 5,204,955 | 4/1993 | Kagei et al. | 395/575 |
| 5,212,771 | 5/1993 | Gane et al. | 395/357 |
| 5,412,652 | 5/1995 | Lu | 370/223 |
| 5,434,852 | 7/1995 | La Porta et al. | 370/385 |
| 5,504,921 | 4/1996 | Dev et al. | 395/800 |
| 5,537,547 | 7/1996 | Chan et al. | 395/200.02 |

FOREIGN PATENT DOCUMENTS

| 0458495 A2 | 5/1991 | European Pat. Off. |
| 0529787 A2 | 3/1993 | European Pat. Off. |
| 0599706 A2 | 11/1993 | European Pat. Off. |
| 0585082 A2 | 3/1994 | European Pat. Off. |
| 93/18598 | 9/1993 | WIPO. |

Primary Examiner—Larry D. Donaghue
Assistant Examiner—Walter D. Davis, Jr.
Attorney, Agent, or Firm—Burns, Doane, Swecker & Mathis, LLP

[57] ABSTRACT

A network element included in a telecommunication system contains several nodes (1226, 1232, 1234, 1236, 1238) which are included in a system internal to this network element and provides internal network element functions in an internal bearer service network, and internal resources in the form of hardware and software which are used for performing the internal network element functions.

The network element can offer an operations system a "white box" view, implying that internal resources are available to this operations system, enabling it to use managed objects representing the internal resources in order to manage the resources according to a second management information model in connection with using them for performing internal network element functions.

18 Claims, 21 Drawing Sheets

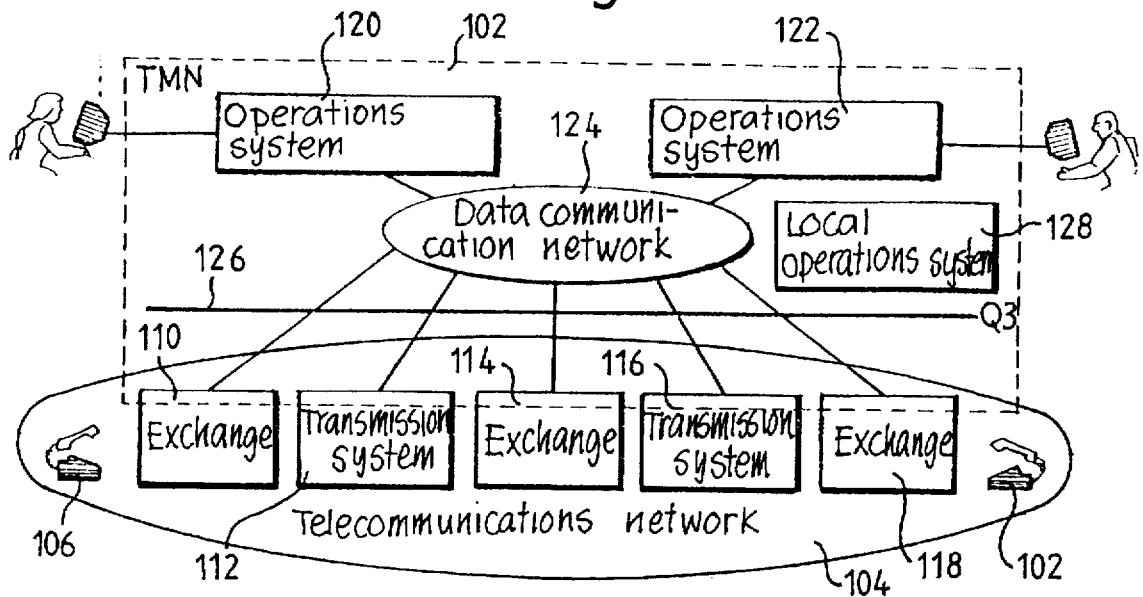
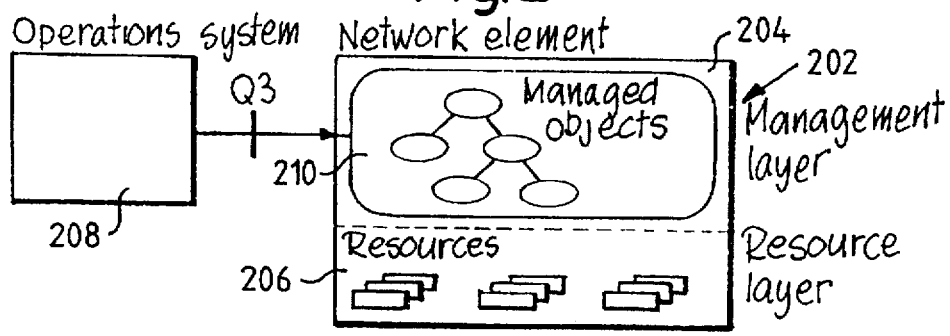
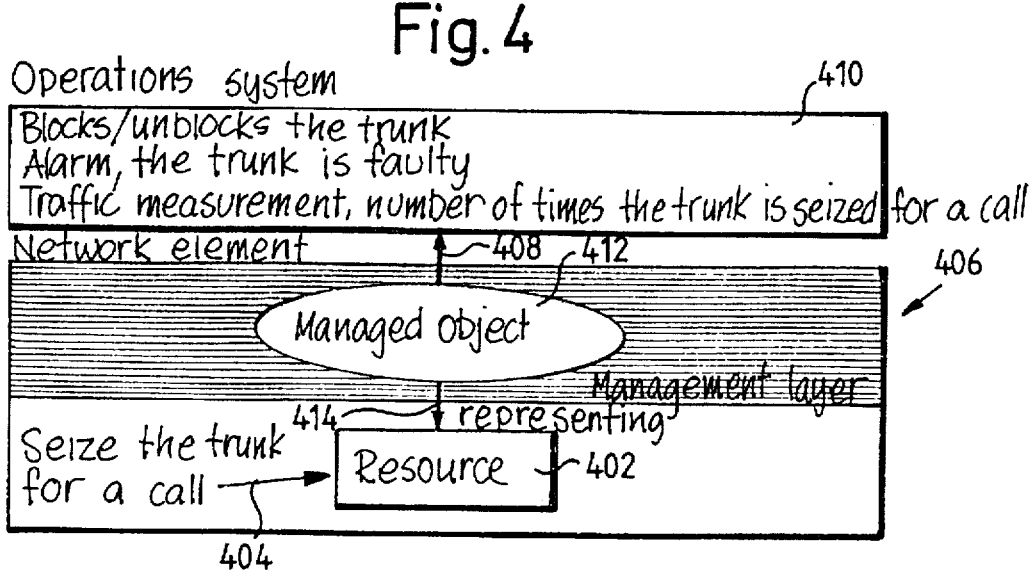

Topological view (G.803)

TELECOMMUNICATION SYSTEM

TECHNICAL FIELD OF THE INVENTION

The present invention generally relates to a telecommunication system comprising a network of network elements which provide network element functions enabling communication between the network elements, and each contain resources in the form of hardware and software which are used for performing the network element functions. At least one operations system is present which for performing the network element functions manages the resources according to a first management information model via managed objects included in the software and representing the resources. By the network elements the operations system is offered a standardized service specific "black box" view, implying that, from a point of view of resource management, only such parts of the resources are available which need to be used in connection with communication between the network elements and between connected subscribers, as well as setting up of calls.

The invention also relates to a network element, which is included in a network of network elements in a telecommunication network, and provides network element functions enabling communication with other network elements included in the network, and contains resources in the form of hardware and software which are used for performing the network element functions by means of at least one operations system which for this purpose manages the resources according to a first management information model via managed objects included in the software and representing the resources, such an operations system by the network element being offered a standardized service specific "black box" view, implying that, from a point of view of resource management, only such parts of the resources are available which need to be used in connection with communication with other network elements and between subscribers connected to the network element, as well as setting up of calls.

Furthermore the invention relates to a method for configuring a network element of the kind just mentioned.

DESCRIPTION OF RELATED ART

The telecommunications networks of today are large and the number of resources in the networks is increasing. The networks provide a wide variety of services and the network equipments often come from different vendors. The network operators use a variety of operations systems to control their networks. Each vendor's equipment has its own operations system and the different services in the network are controlled in different ways, which results in high costs for operation and maintenance.

One way of reducing the costs for the network operators has been to develop an international standard on how telecommunications networks will be managed in a uniform and efficient way from a network of operations systems. For this purpose a standard denominated TMN (Telecommunications Management Network) has been suggested for telecommunications management networks. The size of a TMN network can vary from one simple connection between an operations system and a network element, to a whole network of operations systems that control a large telecommunications network. The TMN standard is developed by an organization denominated ITU-TS (International Telecommunication Union for Telecommunication Standardization) and is described in its recommendation M.3010. The ITU-TS recommendations in turn are based upon international standard recommendations suggested by an international organization denominated ISO (International Standardization Organization).

The TMN architecture allows networks elements to be distributed. The management service "Switching Management" in ITU-TS for instance defines a switching network element in the following way: "the NE may consist of one or more parts. The parts can be placed at different locations. One part may provide a Q3 interface, which is common for all managed entities in one exchange".

The TMN recommendations do not however say much more regarding distributed network elements. As a matter of fact there are a number of management information model aspects to take into consideration as will appear below.

Network elements in the inter exchange network, such as transit nodes, signalling transfer points, central service nodes (e.g. GSM service nodes), are typically not distributed. The same can be said for most network elements in the transmission network. Local switching system applications can, on the other hand, benefit from being implemented as distributed network elements.

U.S. Pat. No. 5,204,955 discloses a network including an integrated management system for the network as a whole, as well as management systems for individual parts of the network.

U.S. Pat. No. 5,031,211 describes a communication system including subnetworks, each of these networks having a management system.

SUMMARY

It is an object of the invention to provide a management information model which decreases the costs for operation and maintenance of the internal network in a network element included in a telecommunication system of the kind referred to by way of introduction.

This object has been attained in that, in the telecommunication system, at least one of the network elements includes several nodes forming part of an internal system of the network element. These nodes provide in this internal system internal network element functions in an internal bearer service network, as well as internal resources in the form of hardware and software for performing said internal network element functions. The software includes managed objects representing the internal resources. The network element offers an operations system a "white box" view. In this view the internal resources are available to this operations system for using the managed objects representing the internal resources in order to manage the resources according to a second management information model in connection with using them for performing internal network element functions.

For configuring the network element according to the invention a network element internal system is created, in which nodes included in the network element provide the internal network element functions in an internal bearer service network. A "white box" view is introduced which may be offered an operations system. In this view internal resources are available to the operations system and may be managed thereby by means of managed objects representing the internal resources. Furthermore a second management information model is introduced, according to which such an operations system can manage the internal resources in connection with using them for performing internal network element functions.

DESCRIPTION OF THE DRAWINGS

The invention will now be described more closely below with reference to embodiments shown on the attached drawings, on which FIGS. 1–13 are intended to generally illustrate a technical standard which may be said to form one of the basic grounds for, and elucidate later described embodiments of the invention, wherein FIG. 1 shows an example of a telecommunication network according to TMN, FIG. 2 schematically illustrates division of a network element included in FIG. 1 in a management layer and a resource layer, FIG. 3 schematically illustrates three standard types of resources of the kind included in a network as that shown in FIG. 1, FIG. 4 schematically illustrates an example of how an operations system supervises and controls a resource via a managing object representing the resource, FIGS. 5–7 schematically illustrate different examples of how managed objects can represent resources and other objects, FIG. 8 shows an example of hardware included in a simple network element which may be included in the telecommunication network according to FIG. 1, FIG. 9 shows the management layer of the network element according to FIG. 8, FIG. 10 shows a management information tree built up of managed object included in the management layer in FIG. 9, FIG. 11 is a view illustrating communication and interaction between an operations system and managed objects included in a nettwork element, FIG. 12 shows a first example of a telecommunication system including distributed network elements, FIG. 13 shows a second example of a telecommunication system including distributed network elements, FIG. 29 shows a reference configuration of a distributed network element used for describing, with reference to FIGS. 28–36, examples of use of the management information model according to FIGS. 23–26, wherein FIG. 36 shows a configuration of visable channels/ channel groups on a subnetwork level of the distributed network element, for forming a basis for a description with reference to FIGS. 37 and 38 of the establishment of crossconnections over several nodes, wherein

DETAILED DESCRIPTION OF EMBODIMENTS

Figure 3:
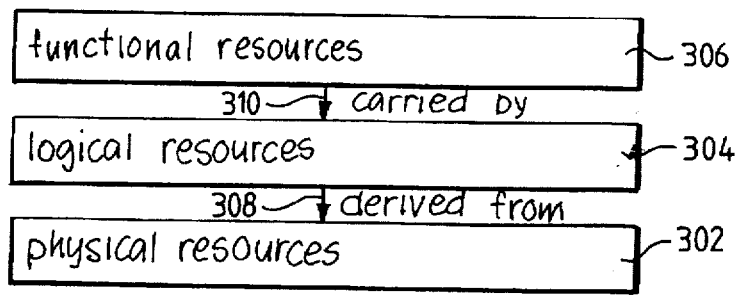

As a first introduction to the following description of embodiments of the invention, and since these embodiments for practical reasons mainly are based on application of the invention in a TMN environment, a number of terms and concepts in this connection will be described more closely with reference to FIGS. 1–11. However, as will appear later on, use of the invention is not restricted to this environment, but can be stated to comprise all environments based upon the international ISO standard.

FIG. 1 schematically shows a management view 102 according to TMN for a telecommunication network 104. In the later there is indicated how two subscribers 106 and 108 are interconnected via network elements in the form of a first exchange 110, to which the subscriber 106 belongs, a first transmission system 112, a transit exchange 114, a second transmission system 116, and a second exchange 118, to which the subscriber 108 belongs. Besides the management view 102 the network elements 110–118 also include two operations systems 120 and 122 which via a data communication network 124 and a Q3 interface 126 communicate with the elements 110–118. A local operations system 128 communicates directly with the exchange 108 via the interface 126. Q3 is a standardized physical interface between two TMN building blocks, such as network elements and operations systems. It consists of two parts, viz. a management protocol and a management information model visible in the interface.

The interface 126 over which the operations systems, such as 120, 122 and 128, view the telecommunication network 104 in TMN, is a standardized machine-machine interface where all types of network equipment can be monitored and controlled in a similar manner. The Q3 interface defines both an object oriented information model of the network elements 110–118, and the communication protocol between the operations systems 120, 122 and the network elements 110–118.

With reference to FIG. 2 a schematically illustrated network element 202 is divided into a management layer 204 and a resource layer 206. From the operations system, here designated 208, only the management layer 204 is visible. The management layer 204 consists of a collection of managed objects 210, which can be monitored and controlled from the operations system 208 via the Q3 interface. The managed objects are chosen with respect to how the network element will appear to a maintenance technician. There are standardized managed objects for most applications. Consequently, a maintenance technician will know his way about when controlling network elements from different vendors.

The resource layer 206 is the real implementation of the network element 202. Resources are chosen for the best characteristics of the system. Execution time and memory consumption are examples of characteristics to consider when implementing the resource layer. With reference to FIG. 3 the standards talk about three types of resources, viz. physical resources 302, logical resources 304, and functional resources 306.

Physical resources are e.g. hardware equipment and pieces of software.

Logical resources are abstract system parts which are derived, indicated by arrow 308, from the physical resources to provide services. Examples of logical resources are:

Subscriber. This contains data related to a particular subscriber.

Line termination point. Realized by a line interface circuit and related software together.

Route. Realized as a data table and functions for operating on that table.

Trunk. A speech channel in a PCM link.

Processor. Realized by processor hardware and operating system software together.

Functional resources carry the logical resources, indicated by arrow 310, and are system parts providing a function, e.g. a line testing function, a speech analysis table, and a resource handler for a specific kind of resource.

The resources in a network element are used by the traffic handling. A trunk is e.g. used to carry a telephone call in one direction. As already mentioned, only the management layer of the network element appears to operations systems. If a trunk is to be manageable from an operations system, it must be represented by a managed object.

As an example FIG. 4 shows how a trunk resource 402 is seized, arrow 404, for a call internally in a network element 406. It also shows how the resource 402 can be monitored and controlled, arrow 408, from an operations system 410 through a managed object 412, that represents, arrow 414, the trunk resource 402. The managed object 412 then acts as an "interface" towards the operations system. A managed object cannot store any data, but all data belong to the resources. There is not necessarily a 1-to-1 mapping between managed objects and resources. Several managed objects can be implemented as one resource, cf. FIG. 5, in which two managed objects 502 and 504 represent and give each its management view of a resource 506. A reason to implement the two managed objects as one resource, is to achieve better characteristics of the application.

Figure 6:
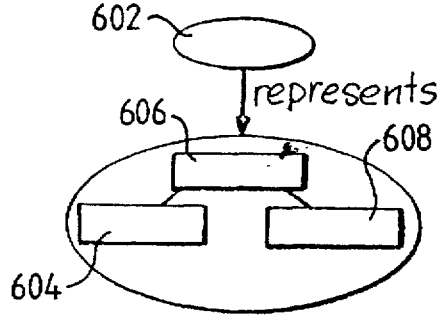

More complex managed objects could be implemented as a combination of resources, as in FIG. 6, that shows a managed object 602 representing a combination of three resources 604, 606 and 608.

Figure 7:
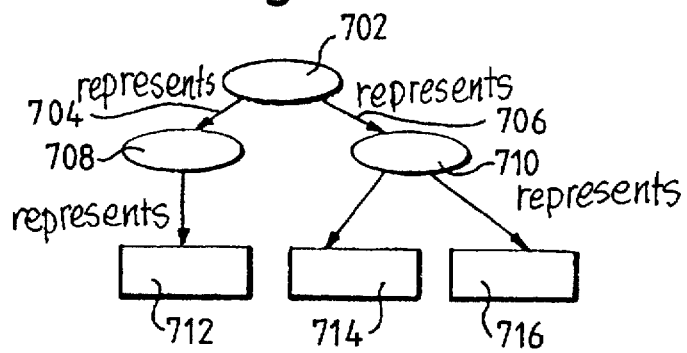

A managed object can also represent other managed objects to rise the level of abstraction, cf. FIG. 7, where a managed object 702 represents, arrows 704 and 706, two other objects 708 and 710, respectively. The object 708 then represents a resource 712, and the object 710 represents two resources 714 and 716. Operations support functions can then be implemented in the highest managed object 702 instead of in an operations system.

Figure 8:
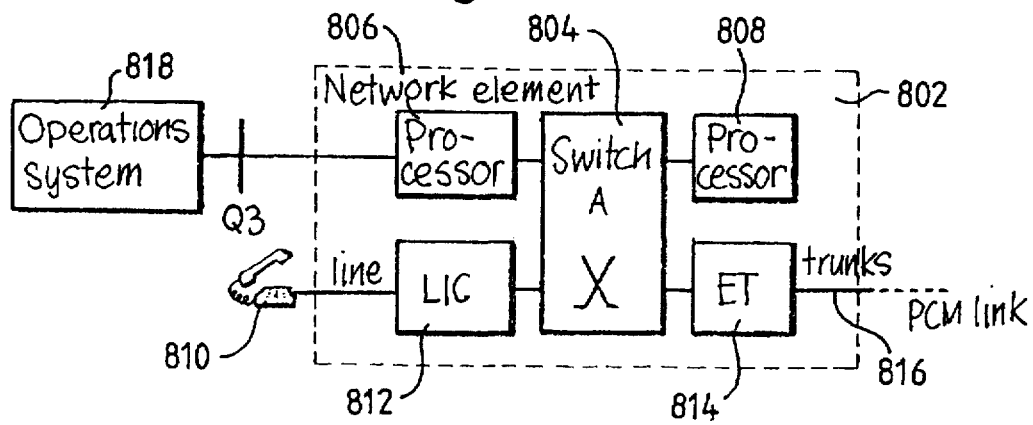

In FIG. 8 the hardware of a simple network element 802 is shown, which may here be assumed to correspond e.g. to the local exchange 110 in FIG. 1. The network element 802 includes a switch 804, to which two processors 806 and 808 are shown to be connected. To the switch 804 a subscriber 810 is connected, which may be imagined to be the same as the subscriber 106 in FIG. 1, via a subscriber line circuit 812. The network element 802 has a connection to the rest of the network through an exchange terminal 814, which communicates over a PCM link 816. This simple network element can be monitored and controlled from an operations system 818, connected to the processor 806, corresponding to the operations system 120 in FIG. 1.

Figure 9:
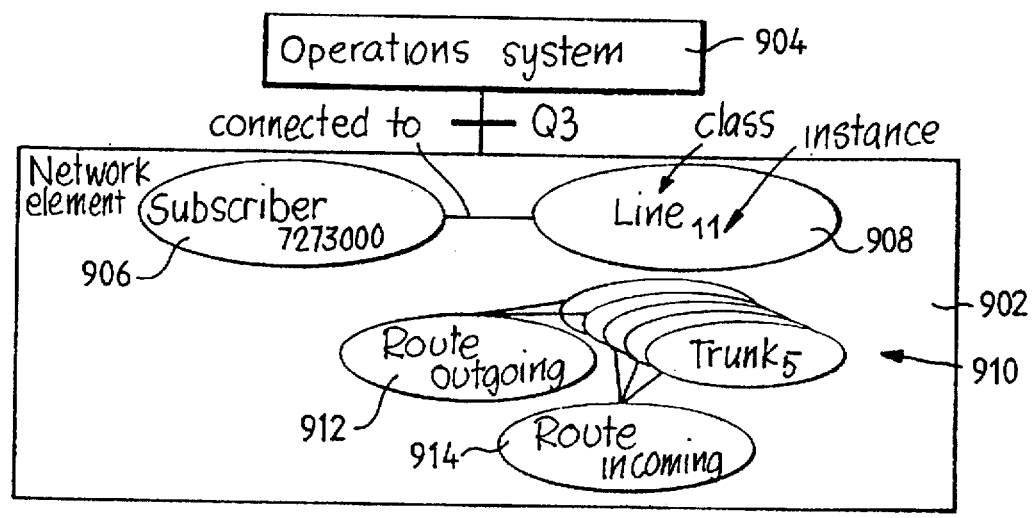

FIG. 9 only shows the management layer of the network element in FIG. 8 and is designated 902, the operations system being designated 904. More particularly, the management layer 902 consists of managed objects which are indicated with respective class names and instances in FIG. 9.

In the management layer 902 the subscriber 810 in FIG. 8 is represented by an instance 7273000 of an object 906 of the class Subscriber. The object 906 contains subscriber data and is connected to an instance 11 of an object 908 of the class Subscriber-line, that holds line connection data. More particularly this object represents the line between the subscriber and the line circuit 812 in FIG. 8. The speech channels in the PCM link 816 in FIG. 8 are represented by each an instance of an object 910 of the class Trunk. In the network element there are two trunks shown to be connected to an outgoing direction, whereas three trunks are connected to an incoming direction. This is represented by an instance "outgoing" of an object 912 of the class Route, and an instance "incoming", respectively, of an object 914 of the same class. The rest of the trunks in the PCM link are not used in the network element 802.

The data of a managed object is specified as attributes. A managed object attribute can correspond to a persistently stored attribute of a resource object, but it can also be calculated in an algorithm that fetches attributes from several resource objects. Resource data can also be stored in the file system or in hardware registers. A trunk managed object can e.g. have the following attributes: trunkId, state, and myRoute. In this case, all three attributes correspond to attributes in the same resource object.

Operations that can be performed on a managed object are:

create and delete an instance of a managed object,
get and set an attribute value,
action requests a managed object to carry out a task.

Actions are used when the operation is more complex than just getting or setting an attribute value for a managed object. Actions involve the object as a whole, but can also indirectly involve other objects.

A managed object sends a notification, and informs the operations system that an event has occurred in the network element. An alarm condition is an example of a notification. Notifications are also used for other purposes, e.g. charging data and traffic statistics. When it takes long time to perform an action, the action return value can tell that the action has started. Then the result of the action is sent as a notification. In addition, managed objects can have associative relationships to other managed objects. Trunks can e.g. be members of a route. Associative relationships are specified as attributes.

In the network element disclosed above with reference to FIGS. 8 and 9 there are several trunks. All of them have the same attributes, actions and notifications. In object oriented terms they are instances of the managed object class Trunk.

The collection of all created managed object instances in a network element is called the Management Information Base MIB. The management information base is an abstract concept and is not to be confused with a physical data base which can be used to store data persistently within a system.

Figure 10:
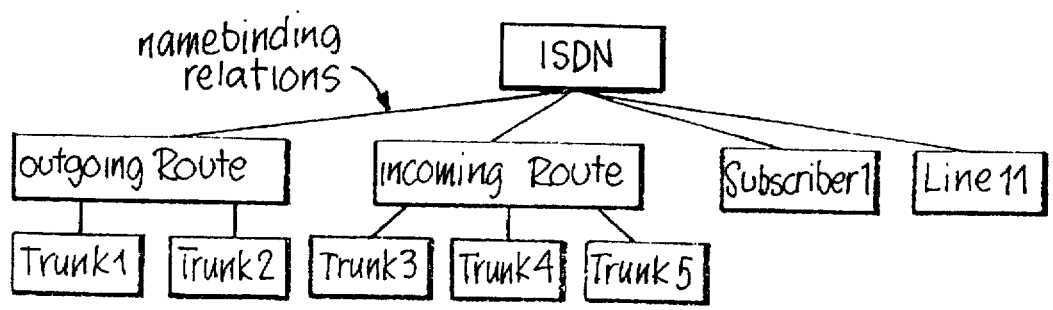

In some network elements there may be a large number of managed objects. To be able to search for a particular managed object and navigate between all created managed object instances in a network element, it is necessary to have a settled naming structure. The standard recommends the tree structure or management information tree MIT earlier mentioned. Relationships forming the MIT are called name binding relations. In FIG. 10 the MIT for the example described above with reference to FIGS. 8 and 9 is shown, it being assumed that the network element 802/902 forms part of an ISDN network.

Each managed object gets an instance name when it is created. All managed objects that are "children" of the same managed object must have different instance names. The instance name does not need to be unique within the managed system, but two managed objects can have the same instance name provided that they have different "parents".

Every managed object also has a name that is used to identify it uniquely within the whole managed system, called a Distinguished Name DN. The distinguished name starts from a root of the MIT and finishes with the instance name of the managed object. In appearance, it looks much like a UNIX full path name. As an example the distinguished name of the instance Trunk5 of the managed object Trunk can be written:

DN={Route=incomingRoute/Trunk=Trunk5}

The communication between operations systems and network elements is defined in the Q3 interface. The standards recommend how to reach and operate managed objects from an operations system. In addition, the standards recommend how managed objects are to inform the operations system about events in the network element.

Figure 11:
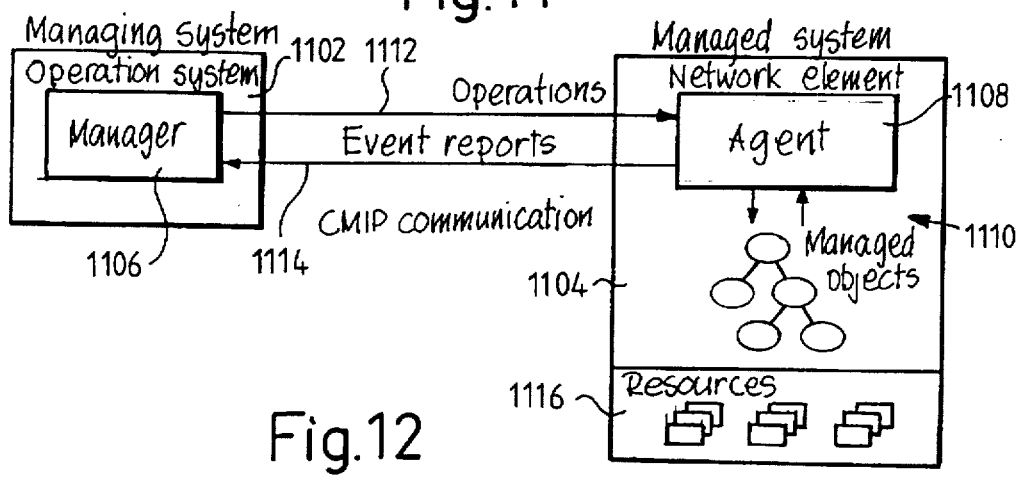

A manager in the operations system manipulates the managed objects in the network element via an agent. The interaction between the manager and the agent is shown in FIG. 11. The operations system designated 1102 in FIG. 11 is the managing system and the network element designated 1104 is the managed system. The manager is designated 1106 and the agent 1108.

The manager 1106 initiates the contact with the agent 1108 by establishing an association to the agent. This association can be seen as a communication link between the two systems. When the association has been set up, the manager and the agent can communicate with each other. The manager 1106 manipulates the managed objects designated 1110 using defined operations (create, delete, set, get and action) indicated by arrow 1112. The managed objects 1110 generate information, notifications, which can be forwarded as event reports, arrow 1114, to the operations system. The operations and event reports are parts of a Common Management Information Service CMIS.

Local switching system applications can often benefit from being implemented as distributed network elements. Two examples, which will be used to illustrate this, are shown in FIGS. 12 and 13.

Figure 12:
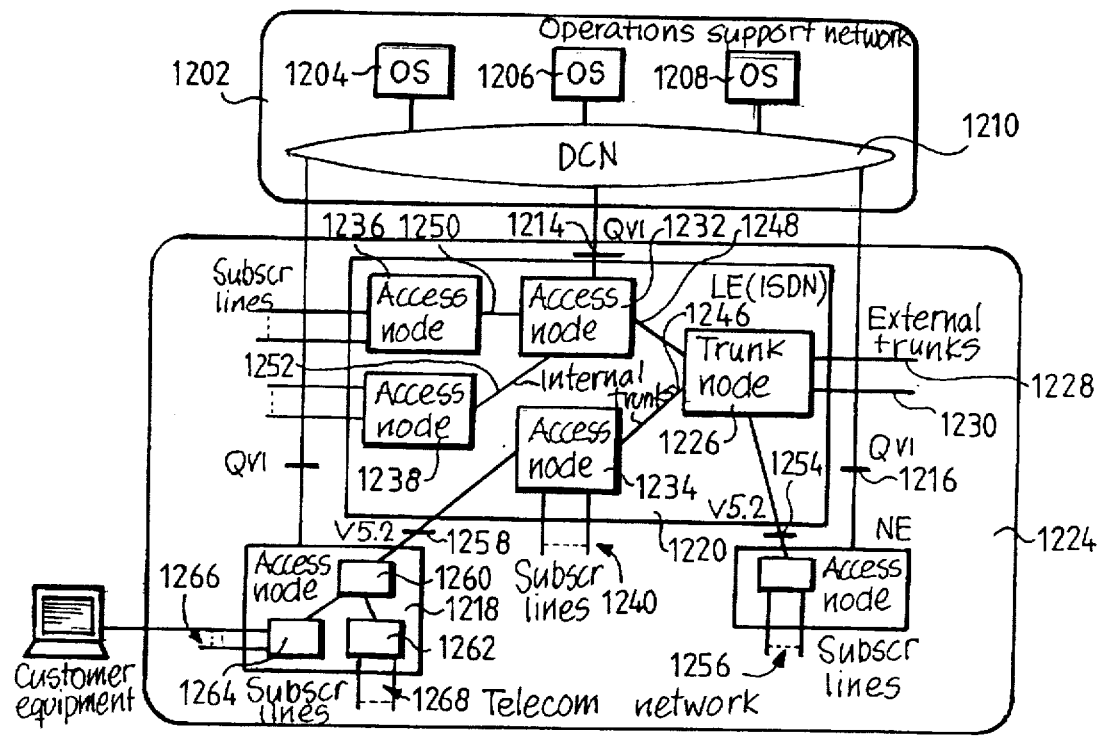
Figure 5:
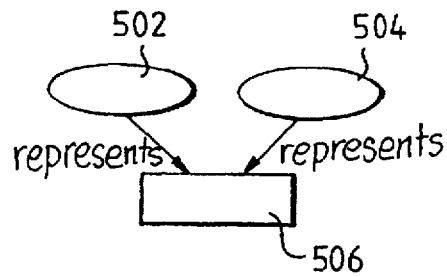
Figure 13:
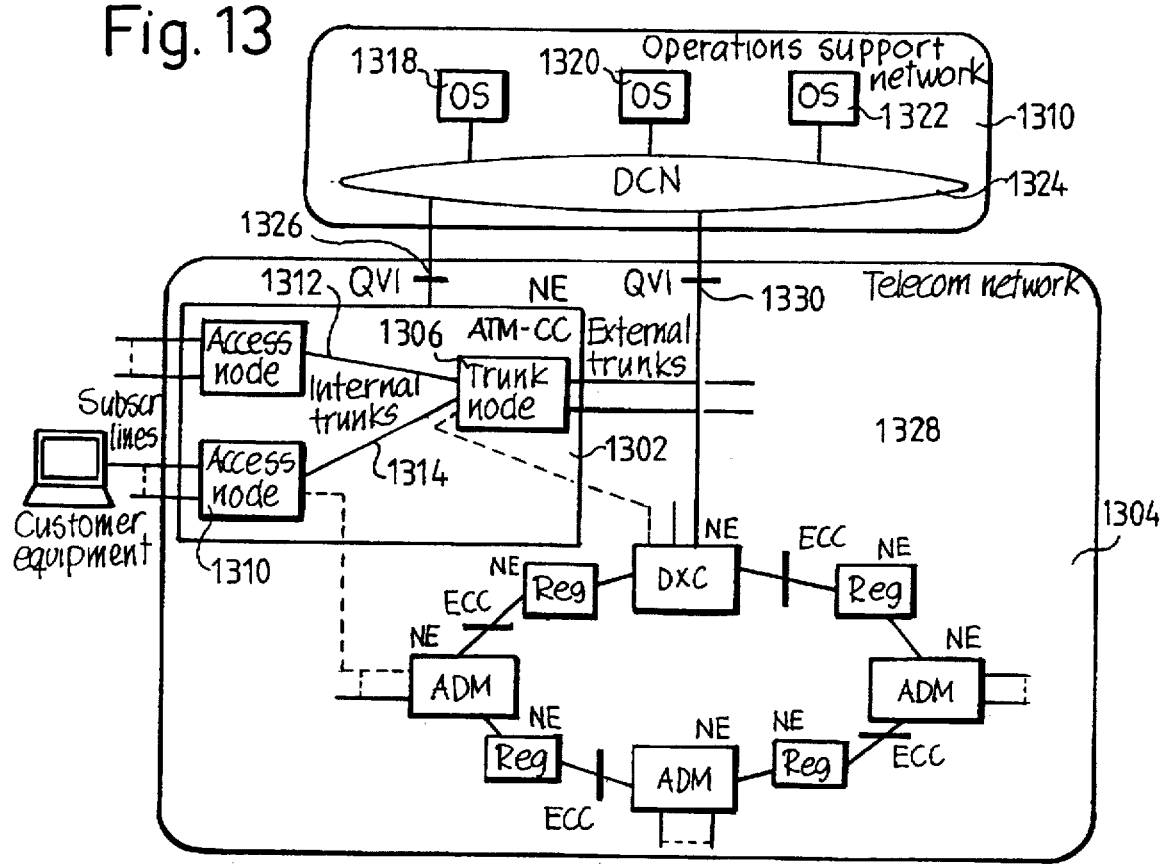

FIG. 12 shows an operations support network 1202 that includes three operations systems 1204, 1206 and 1208. The operations systems 1204, 1206 and 1208 communicate via a data communication network 1210 and Q interfaces 1212, 1214 and 1216 with network elements 1218, 1220 and 1222, respectively, which are included in a telecommunication network 1224, that can here be assumed to be e.g. a B-ISDN access and local exchange network.

The network element 1220 is a distributed local exchange including a central node 1226, which is connected to two sets of external links 1228 and 1230, which can lead to e.g. a national exchange and an international exchange, respectively. The network element 1220 furthermore includes remote access nodes 1232, 1234, 1236 and 1238, of which the access nodes 1234, 1236 and 1238 have connections from subscriber lines 1240, 1242 and 1244, respectively. The communication between the node 1226 and the access nodes is performed via internal links 1246, 1248, 1250 and 1252.

The node 1226 furthermore communicates via an interface 1254 with an access node, forming the network element 1222, which is controlled from the local exchange 1220. To the access node 1222 subscriber lines 1256 are connected.

The access node 1234 communicates via an interface 1258 with three access nodes 1260, 1262 and 1264 in the network element 1218, to which subscriber lines 1266 and 1268 are connected. The node 1264 can e.g. form a connection to a company exchange. The network element 1218 can also be distributed and likewise be controlled from the local exchange 1220.

The B-ISDN local exchange network described above with reference to FIG. 12 is an example of a scenario in which some access nodes form part of a distributed network element whereas other ones may e.g. be generic access node products GAP, that are managed as network elements on their own.

The example in FIG. 13 shows a similar scenario for a local ATM crossconnect application in form of a distributed network element 1302 included in an ATM access and transport network 1304 (ATM—Asynchronous Transfer Mode). By the concept "crossconnect" is here and henceforth meant the same as "crossconnect" according to ATM standard which relates to a connection set up via an operator. By ATM standard is here and below meant the standardized management information model for an ATM network which is e.g. described in ETS DE/NA5-2210-Version 03 Helsinki 25-29 Apr. 94 "B-ISDN Management Architecture and Management Information Model for the ATM crossconnect".

In the network element 1302 there is included a central node 1306 connected to two remote access nodes 1308 and 1310 via internal links 1312 and 1314.

An operations support network 1316 includes operations systems 1318, 1320 and 1322, via which a data communication network 1324 and a Q interface 1326 are connectable to the network element 1302.

A SDH network 1328 forming a connection route (possibly alternative) between the nodes 1306 and 1310 is connected to the data communication network 1324 via a Q interface 1330. (SDH—Synchronous Digital Hierarchy).

There are a number of reasons why it can be beneficial to implement a local exchange, as the examples given above, and part of its local access network, as a single distributed network element.

In a local exchange switching domain that supports advanced access network functions—such as "distributed connection switching" with centralized call control, "stand alone switching" in access nodes, non-standard access nodes, "multi-homing", etc., the control interfaces, for signalling as well as service relations, in between the different remote and central nodes may be quite complex. If each node in such a distributed local exchange network is to be a separate network element, these control interfaces need to be standardized. When the market cannot wait for this, proprietary interfaces have to be used. It can then be convenient to have all the "non-standard" nodes of the local exchange network as a single "distributed" network element that, as seen from the outside, is adapted to "standardized" network management interfaces and procedures.

Another reason for implementing several nodes together as a "single" network element, is that if one can use proprietary interfaces between central and remote parts, one can in some cases achieve essentially lower total cost for the internal computer system. This is because remote "simple" nodes then can share many expensive control system infrastructure functions and resources, which can be placed in one or more central nodes within the distribute network element domain. Such resources are for instance general computer system functions and resources for storing and output of generated charging and performings monitoring data, termination of full Q interface stack, advanced software and equipment management functions, backup and I/O devices, etc.

For network elements in general and for distributed network elements in particular, two different management views will here be introduced. The first view will here be called the "black box" view. This is the view used by the majority of standardized management services, such as traffic management, routing and digit analysis administration, management of ATM transport network, etc. These management services see a network element as a "black box", containing a number of managed services and a number of inlets and outlets to be managed.

The essence of the "black box" view is that it does not show aspects that are particular to the system internal implementation technology. It does not show management information that relates to configuration of the system internal computer system, such as the number of data managing resources being present and how different software units are allocated/distributed.

The second management view will here be called "white box" view. In this view the internal structure, distribution and technology aspects of the network element is managed. This view supports system specific management services such as software upgrade, configuration (distribution) and utilization, equipment repair handling, management of system internal operating system data, management of internal switching network, etc.

Figure 14:
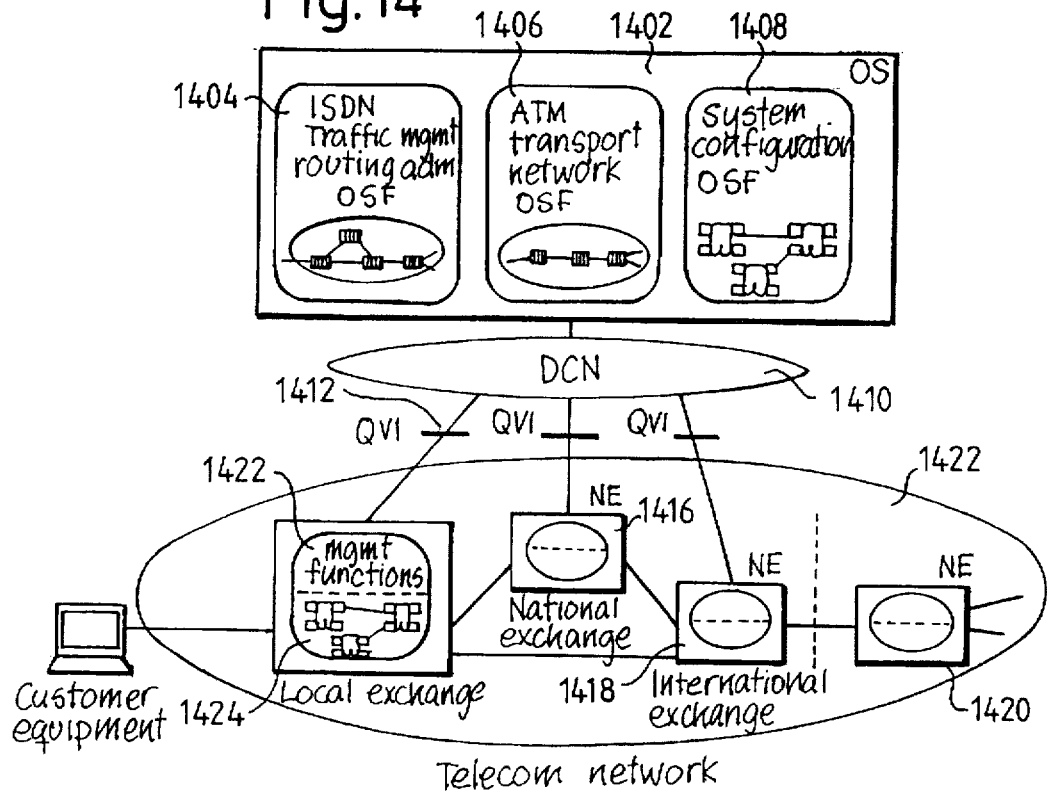
FIG. 14 shows an example of two different scenarios for managing a distributed network element.

FIG. 14 illustrates the two management views. It shows an operations system 1402 with two "black box" operations systems functions 1404 and 1406 for ISDN network management and ATM transport network management, respectively. It also shows a "white box" operations system function 1408 for management, via the data communication network 1410 and a Q interface 1412, of system internal communication links and logical switch functions of a distributed local exchange network element 1414. The network element 1414 is shown, together with three further network elements 1416, 1418 and 1420, to be included in a telecommunication network 1422 in which the four network elements offer ISDN services supported by the ISDN operations system function 1404. Furthermore the network elements 1414, 1418 and 1420 offer ATM transport network services, which are supported by the ATM operations support function 1406. The network elements 1416 and 1418 can e.g. be assumed to be a national exchange and an international exchange, respectively, with which the network element 1414 communicates. In the Figure, the network element 1414 is shown with both a management layer 1424 and a resource layer 1426.

The pictures in the lower part of the operations system functions 1404, 1406 and 1408 are intended to symbolize the "black box", "black box", and "white box" views, respectively. In the resource layer 1424 of the network element 1414 the "white box" symbol in question appears again for indicating hardware structure.

Figure 15:
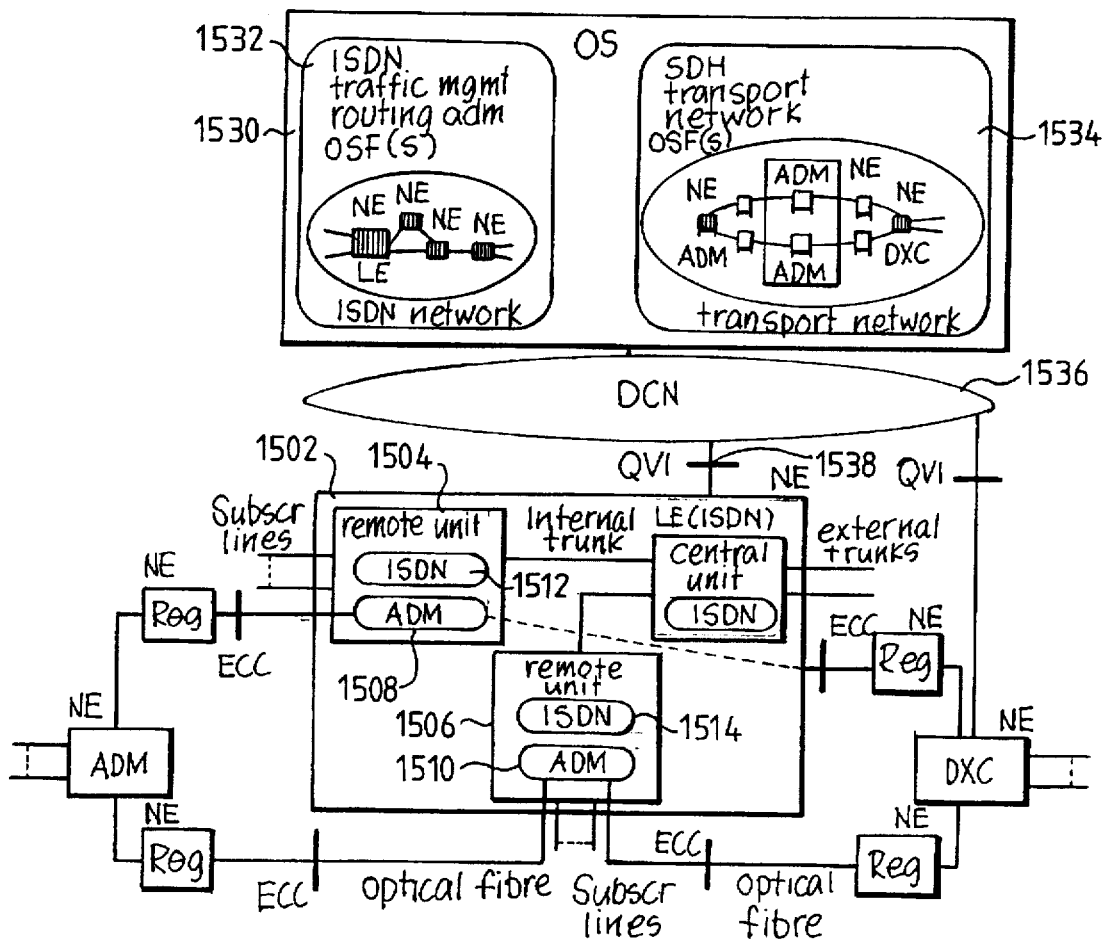
FIG. 15 shows an example of physical integration of transport network functions in a distributed network element.

It should be emphasized that the relation between the management view of network resources and the physical network elements is not always simple. This shall be illustrated with reference to FIG. 15 which shows separate add-drop multiplexor functions which are physically integrated into a distributed network element. More particularly, there is the question of a scenario with a distributed switch 1502 in the form of a B-ISDN local exchange, that includes, on the same printed circuit boards 1504 and 1506 and/or in the same subrack, both transport network resources 1508 and 1510, respectively, in the form of add-drop multiplexors, included in a SDH network 1511, and switching resources 1512 and 1514, respectively, of the local exchange 1502. Also, the implementation of the SDH resources in the exchange use the same internal system services, such as the system internal processor system, as are used by other exchange resources.

At 1530 there is shown the associated operations system with "black box" operations systems functions 1532 and 1534 for ISDN network management and SDH transport network management, respectively. The operations system 1530 communicates with the network element 1502 via a data communication network 1536 and a Q interface 1538.

Such a local exchange must be treated as one single physical network element, since the "white box" management of equipment, software and data resources would otherwise be very complex, and since also the "black box" network management of the switched application, i.e. ISDN traffic management and routing administration, looks at a local exchange as a single network function entity.

The operations system function 1534 for standard "black box" SDH network management, however, treats each separate SDH add-drop multiplexor as a separate network function entity independently of whether it is a single ADM network element (ADM=Add-Drop Multiplexor), such as the one shown at 1540, or is provided by the local exchange, such as the multiplexors 1508 and 1510. In the SDH network managing view the managed entities are thus not all provided by separate network elements. The operations support function 1532 for standardized network management of the switched application will still manage the network element 1502 as a "black box".

Here some "white box" management information aspects will be discussed more closely, which relate to internal distribution in a network element. For this purpose the distributed local exchange element 1220 in FIG. 12 will be used as an example and described more in detail with reference to FIG. 16. In order to show the connection with the network element in FIG. 12, the reference characters in FIG. 16 agree with those used in FIG. 12 for corresponding elements except for the two first digits, which in FIG. 16 are 16 for indicating the association with this Figure.

Figure 16:
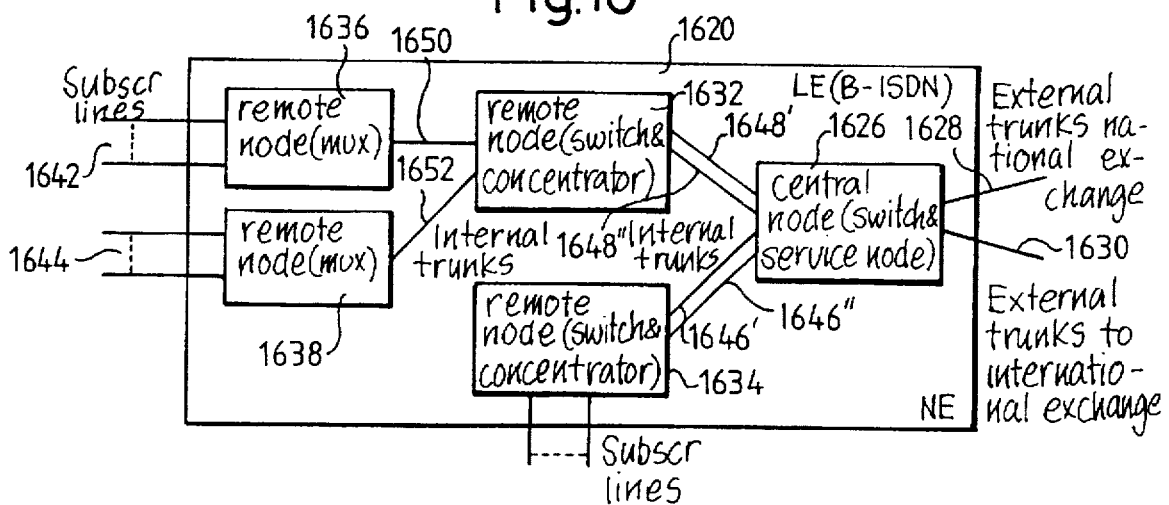
FIG. 16 shows an example of the physical implementation of a distributed work element.

The distributed local exchange network element 1620 in FIG. 16, thus corresponding to the network element 1220 in FIG. 12, is more particularly assumed to provide both ATM crossconnect and B-ISDN switched services. It thus consists of five internal nodes in different geographical positions, viz. a central switch/service node 1626, two remote switches/concentrators 1632 and 1634, respectively, and two remote multiplexor nodes 1636 and 1638, respectively. Between the node 1626 on the one hand and the nodes 1632 and 1634 on the other hand there are alternative links 1646', 1646" and 1648', 1648", respectively, which is not shown in FIG. 12.

During installation, upgrade, alarm, repair of equipment resources, e.g. printed boards, power units etc., in a distributed network element it is necessary for the administrative staff of the system to obtain information regarding the physical location of the individual equipment resources. The managed information model must in some way include this information.

TMN standard recommendations (ITU-TS M.3100) specify that each equipment resource should be represented by a managed object of the "Equipment" class, or a subclass thereof. This managed object class contains an attribute "LocationName", which should contain information regarding the physical location of the equipment resource. It represents a "site", i.e. a geographical location, where equipment resources such as cabinet, subracks and their plugged in printed circuit boards are located.

If e.g. one of the remote multiplexors in FIG. 16 detects an equipment failure then an alarm event report of the type "Equipment alarm" will be sent from the network element to the operations system. From the alarm report the operator could read the attribute "LocationName" and send repair people to the stated location.

During configuration of the distributed processor network in the network element it is necessary to manage the internal processor communication services, i.e. routing information must be defined for each processor station (node) and links must be configured between these. Each link is implemented with a connection oriented packet service which can "bridge over" an internal packet node network. If e.g. the remote switches in FIG. 16 contain an internal packet switch, which is used for switching of processor packets, this must have been configured for each packet connection.

Here an example will now be described shortly that relates to how call routing and internal routing information for the distributed ATM switch in FIG. 16 is configured. As described earlier the standardized management information model of the network element provides a "black box" view, i.e. the internal distribution is not visible.

Figure 17:
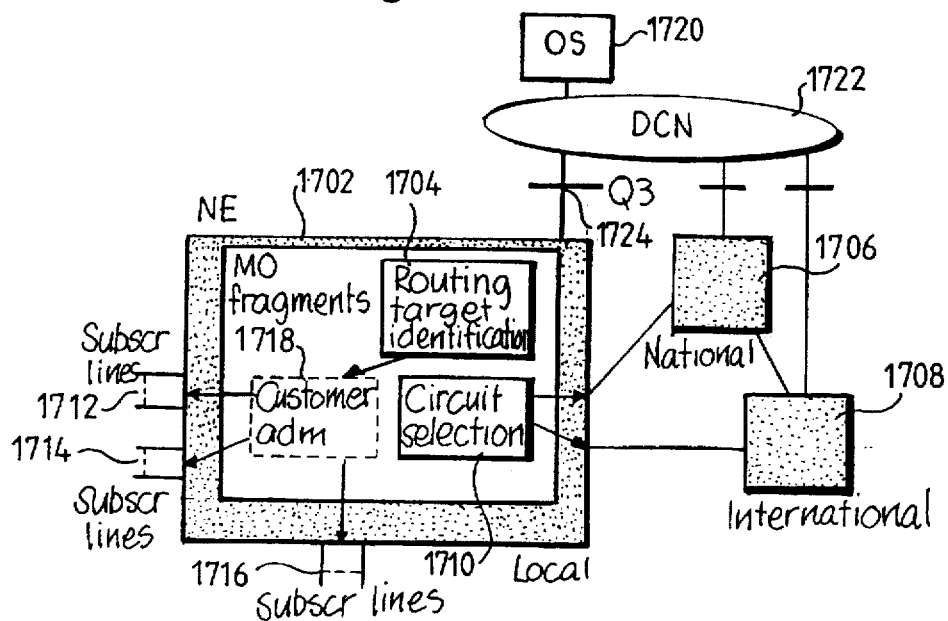
FIG. 17 shows an example of a "black box" view of a network element in FIG. 16.

With reference to FIG. 17 this "black box" view includes a routing target identification fragment 1704, which identifies two destinations 1706 and 1708 for national and international calls, respectively. With "fragment" is here and below intended a number of managed objects which belong together functionally. The corresponding circuit selection fragment is indicated at 1710. Also a great number of local destinations and access ports, of which some are indicated at 1712, 1714 and 1716, are identified for the terminating calls to connected subscribers. The corresponding "customer administration" is indicated at 1718. FIG. 17 also shows an operations system 1720, which via a data communication network 1722 and a Q interface 1724 communicates with the network element 1702 as well as with the exchanges 1706 and 1708. The circuit selection fragment 1710 selects a free circuit in the circuit subgroup identified from the destination and other inputs such as QoS (Quality of Service) of the ATM vc bearer service and required signalling.

As has been described earlier there is also a need that a network element, such as particularly a distributed network element, shall be able to provide a "white box" view for system specific management services, where the internal distribution is visible. In the example according to FIG. 16 there are alternative internal links between the remote exchanges 1632, 1634, 1636 and 1638 and the central switching/service node 1626. Let us however assume that the internal first choice links are realized over an external SDH ring infrastructure connecting the three nodes, and the internal second choice links are realized over an external PDH infrastructure.

For managing this scenario the network element has to provide a second "white box" fragment, besides the earlier mentioned "white box" atm internal network management fragment, for managing internal call routing and resource selection.

Figure 18:
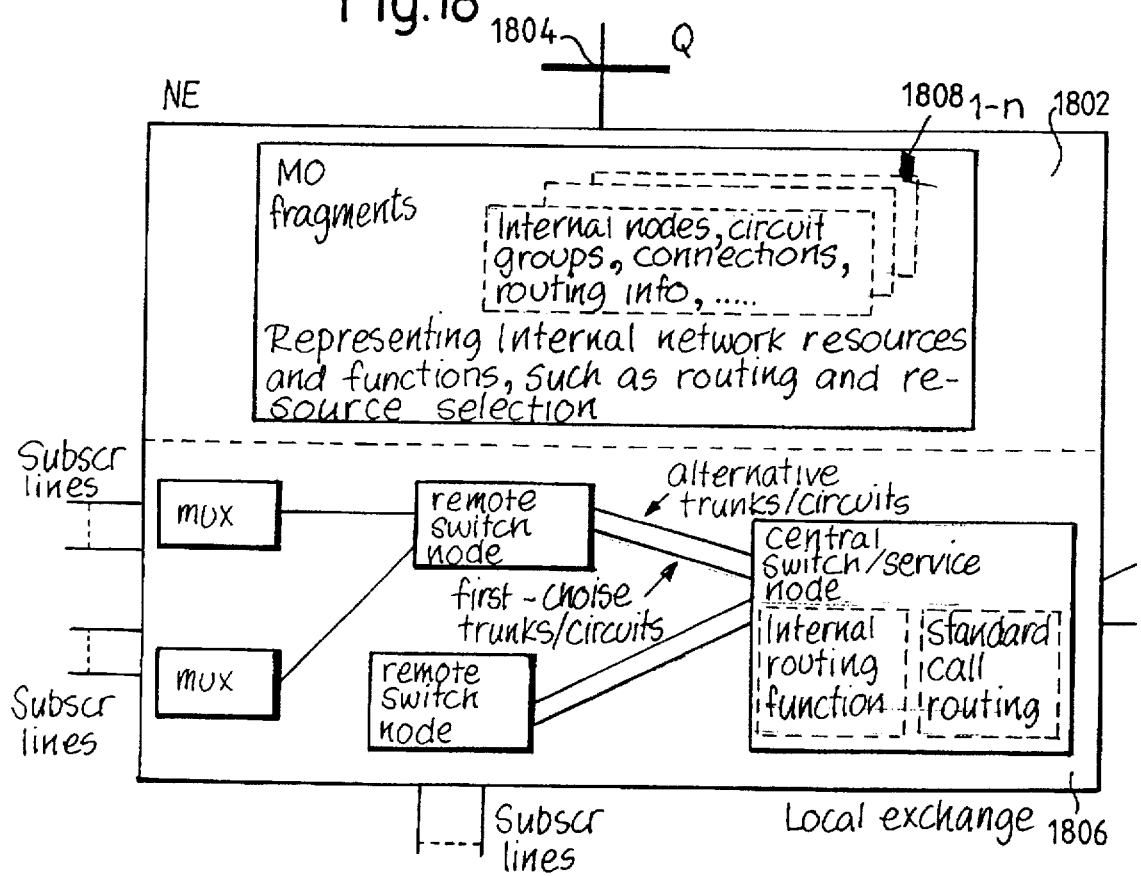
FIG. 18 shows a simplified "white box" view of the network element shown in FIG. 16.

For this purpose the management object model indicated in FIG. 18 is needed, which in the usual way is divided, on the one hand, in a management layer 1802, which via a Q interface 1804 is controlled by an operations system not shown, and on the other hand a resource layer 1806. As shown the resource layer 1806 illustrates the structure of the network element 1620 from FIG. 16.

More particularly there are needed one or more system specific managed object fragments $1808_{1-n}$, which represent the internal network. The internal nodes and how these are connected with the internal links, as well as internal routing and resource selection are represented by this managed object model.

Other examples of system specific management services are:

configuration of crossconnections over "internal segments" such as one or more internal nodes within the network element. This can be needed for testing purposes of internal nodes and links.

fault management of "internal segments", such as fault detection and alarm coordination in case of internal link faults.

performance management of "internal segments", such as gathering transmission quality statistics of internal links.

Support for the application systems if they have a need of construction management services for an internal network of the kind discussed above with reference to FIGS. 16–18, may e.g. according to the invention be provided by a basic system as will appear more closely from below. The support offered is internal resources and functions, such as fault and performance management, internal routing and resource selection for the internal network (bearer service), as well as a corresponding managed object model, here denominated IBSN (Internal Bearer Service Network fragment) in network elements with several nodes.

Figure 19:
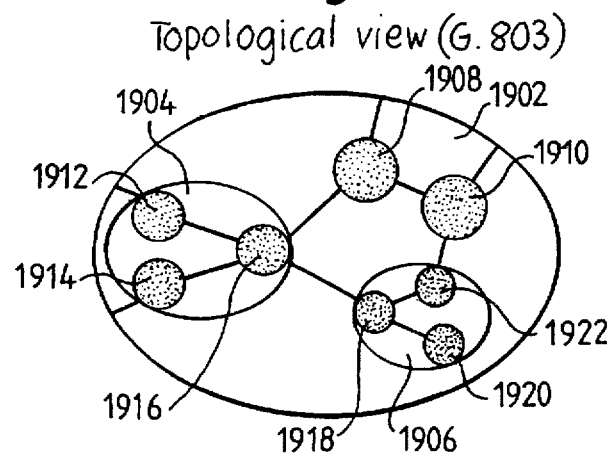
FIG. 19 shows a topological view according to one network standard of telecommunication network.

The managed object model for the internal network provided by the basic system can be based on the following features:

- the internal bearer service nodes are represented by a system specific managed object class, named InternalNetworkNode in FIG. 19
- the internal crossconnect functionality for each "switch node" in the distributed network element is represented by a managed object class based upon standard, such as atmFabric
- for transport applications the internal transmission links/ terminations of connections are represented by standard termination point (TP) managed object classes for the different transport layers. Furthermore also the terminations of the internal circuits for switched applications are represented by such managed object classes
- for internal routing and resource selection also these different termination points are grouped to managed objects which are represented by pools of termination points
- the internal routing information for each internal node is represented by a system specific managed object class
- connections in subnetworks and topological divisions of internal network resources are represented by system specific managed object classes.

Normally this support provided by the basic system is enough in order not to require extensions of the application systems. It is, however, also possible to add application and/or market specific extensions of the IBSN.

As an introduction to a closer description of such managed object classes some essential concepts in the connection will be discussed with reference to FIGS. 19 and 20.

FIG. 19 shows a topological view according to ITU-TS G.803 of a subnetwork 1902 included in a telecommunication network. The subnetwork 1902 includes subnetworks 1904, 1906 and two nodes 1908 and 1910. The subnetwork 1904 forms a network element containing three nodes 1912, 1914 and 1916. The subnetwork 1906 contains three nodes 1918, 1920 and 1922 forming each a network element.

Figure 20:
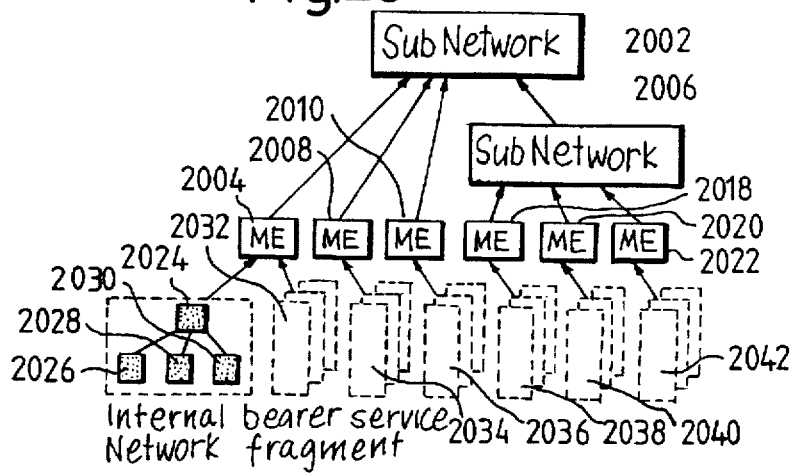
FIG. 20 shows a management information tree for the network according to FIG. 19.

FIG. 20 shows a management information tree of the view in FIG. 19. The subnetwork 1902 is represented by a managed object instance 2002 of a standard class SubNetwork according to ITU-TS M.3100, forming the root of the management information tree. The subnetwork 1904 and the network elements 1908 and 1910 are represented by each its managed object instance 2004, 2008 and 2010, respectively, of a standard class ManagedElement according to ITU-TS M.3100, which have name binding relations to the managed object instance 2002. The subnetwork 1906 is represented by a managed object instance 2006 which is likewise of the standard class SubNetwork and has name binding relation to the managed object instance 2002. The network elements 1918, 1920 and 1922 are represented by each a managed object instance 2018, 2020 and 2022, respectively, of the standard class ManagedElement and with namebinding relations to the managed object instance 2006. The managed object instance 2004 also forms the local root of a manage information tree for network fragments containing managed object instances 2024, 2026, 2028 and 2030 for the internal bearer service between the nodes in the network element 1904. At 2032, 2034, 2036, 2038, 2040 and 2042 there are indicated other fragments with namebinding relations to the managed object instances 2004, 2008, 2010, 2018, 2020 and 2022, respectively.

The managed object instances 2002 and 2006 are typically implemented within an external operations system, whereas the other managed object instances are realized within a network element.

Since the network element 1904 is distributed and due to the fact that its distribution topology is the same as the basic topology for the telecommunication network, the basic thought should be that it should be modelled in a way similar to the modelling of the telecommunication network in the operations support layer of the network. In this connection there are i.a. two fundamental concepts which are applied at modelling of network operations support layers. With reference to ITU-TS G.803 these are "network layering" and "network partitioning". Network layering is a "vertical view", dividing the transport network in different layer networks with client/server associations between them. SDH "path layer network" is e.g. client to SDH "transmission media layer", which acts as server. Network partitioning is a "horisontal view", that divides each layer network into recursive abstraction levels consisting of subnetworks and links, e.g. local, regional and national abstraction levels.

Figure 21:
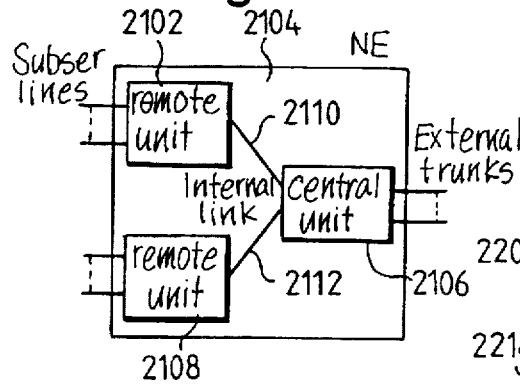
FIG. 21 shows a physical distribution view of a network element included in the telecommunication network according to FIG. 19.

These two concepts should also be applied at modelling of the internal topology of a distributed network element. Network layering is supported by a management object class "InternalLayerNetwork" and network partitioning is supported by a managed object class "InternalSubnetwork", said classes being described more closely below. Recursive partitioning is supported, i.e. subnetworks can be included in greater subnetworks. The lowest level of this recursion which is provided by this fragment is when a particular managed object instance of the class "InternalNetworkNode (INN)" is addressed. With reference to FIG. 21 it can e.g. be represented by a remote switching node 2102 in a distributed ATM crossconnect network element 2104, which e.g. can correspond to the network element 1904 in FIG. 19, the "physical" distribution view of which appears from FIG. 21. Besides the node 2102, the network element 2104 contains a central node 2106 and a further remote node 2108. Between the nodes 2102 and 2108, on the one hand, and the node 2106, on the other hand, there are links 2110 and 2112, respectively.

Figure 22:
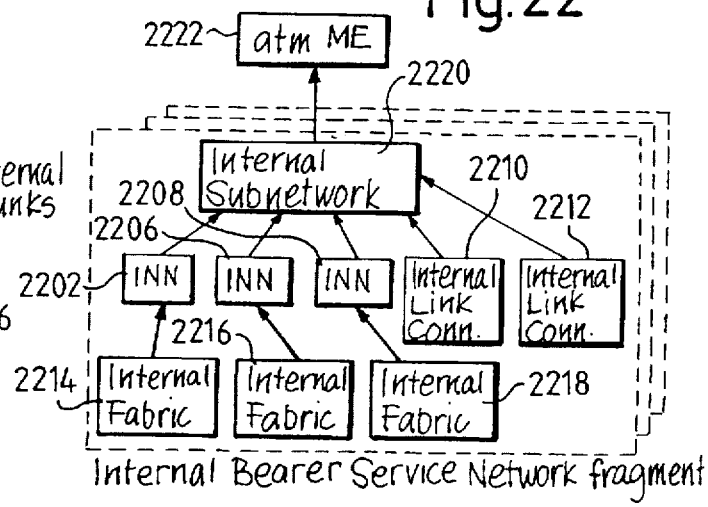
FIG. 22 shows a management information tree for the network element according to FIG. 21.

FIG. 22 shows the corresponding management information tree. In this the nodes 2102, 2106 and 2108 are represented by each an instance 2202, 2206 and 2208, respectively, of the class InternalNetworkNode. Each link connection grouped by the links 2110 and 2112 is represented by each an instance of an object 2210 and 2212, respectively, of a managed object class InternalLinkConnection. The managed object instances 2202, 2206, 2208, 2210, 2212 have namebinding relations to an instance 2220 of a managed object class InternalSubnetwork, said instance representing the internal network within the network element 2104. The instance 2220 in turn has namebinding relation to an instance 2222 of an ATM specific managed object class atmME (ME—ManagedElement). Logical switch functions in the nodes 2102, 2106 and 2108 are represented by managed object instances 2214, 2216 and 2218, respectively, of a managed object class InternalFabric with namebinding relations to the managed object instances 2202, 2206 and 2208, respectively. In the description below, i.a. the classes atmMe, InternalSubnetwork, InternalLinkConnection and InternalFabric will be described more closely.

For the specific network element configuration described above with reference to FIGS. 21 and 22 the operator does not need the class "InternalLayerNetwork", and it was therefore omitted.

Since the need of the managed object class "InternalLayerNetwork" depends on the specific network element configuration, this managed object class has two alternative namebinding definitions which will appear from the more detailed description below with reference to FIG. 23. One of these must be selected. This selection can often be done already at the specification of a network element configuration. At the latest, the selection should be done at the instanciation of the managed object class.

The managed object class "InternalLayerNetwork" is needed 1) when the topology of the distributed network element is of the kind that a complete "Layer Network" according to ITU-TS G.803 is provided in the network element or 2) the relationship between a client and server "Layer network" in the network element should be managed in Q3. A scenario when this could be the case appears when a server "Layer network" is provided as an "internal" infrastructure to the bearer service provided by the network element. One example could be a distributed ATM vc switch network element which is distributed over an "internal" ATM vp transport infrastructure.

Figure 23:
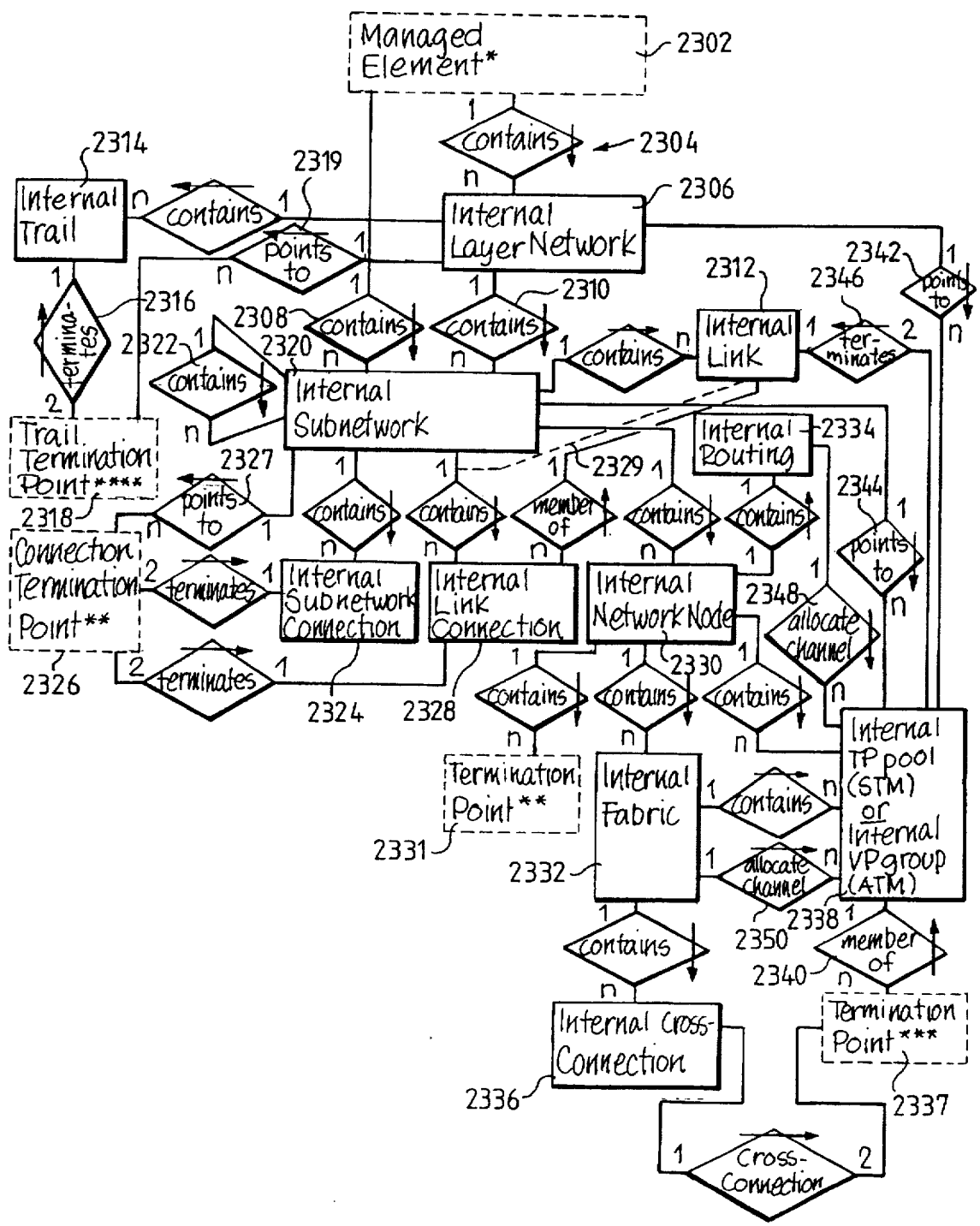
FIG. 23 is a representation of entity relations in one example of a management information model according to the invention.

FIG. 23 is a picture of entity relations in a network fragment for internal bearer services and shows most managed object classes which are of interest at management of a bearer service network in the present connection. More particularly, FIG. 23 shows a management information model which according to the invention is made essentially as a system specific extension of a standardized management information model—in the example shown in FIG. 23 the earlier mentioned management model for an ATM network. As will appear henceforth, however, the invention is not restricted to be applied in an ATM connection.

In FIG. 23 the managed object classes in question are indicated by each a block in the form of a lying rectangle. A dashed such rectangle indicates a class belonging to another fragment, whereas rectangles drawn with unbroken lines relate to classes belonging to the current fragment.

Information regarding relations between the object classes in question can be derived from a block in the form of lying rombic forms. An arrow through each such rombic block points from a managed object class that either "contains", "terminates", "points to", "is a member of", or "crossconnects" the managed object class, towards which the arrow is directed. By these concepts within quotation marks is here meant the same as is defined in ITU-TS M.3010. Furthermore the expression "is contained in" will be used below in some cases as an "inverted" synonym for "contains", i.e. if it is stated that a class "is contained" in another class the same is meant as that the last mentioned class "contains" the first mentioned one. On each side of the rombic block two numbers are stated after each other in the direction of the arrow. These numbers form part of the relation information and state for the nearest rectangular block the number of instances, included in this relation, of the class indicated by this block. In that connection n indicates a number that can be 0 or greater.

The relation view starts from the standard class ManagedElement according to ITU-TS M.3100, indicated by a dashed block 2302. The relation information 2304 associated therewith states, with reference to the above more detailed explanation, that one instance of this class can contain a number of n instances of the next following class in the relation view, viz. the earlier discussed class InternalLayerNetwork at 2306. This managed object class represents a "Layer network" according to ITU-TS G803, included in a distributed network element.

As has been mentioned above the need for this managed object class depends upon the current network scenario. It can be excluded if it is not required for a specific network element in a specific market. Also if this class is included in the "delivery", the operator can choose whether the class shall be instanciated or not. For providing this flexibility there are several alternative relation possibilities, viz. those indicated at 2308 and 2310. According to the relation 2308 the InternalLayerNetwork 2306 will not be instanciated, and therefore n=0 in this case.

Based upon the introductory discussion thus far of that appearing from FIG. 23 the relations between the managed object classes described henceforth should be able to be read from the Figure without a closer explanation thereof, wherefore in most cases such an explanation will be omitted.

Following further managed object classes appear from FIG. 23.

InternalLink 2312. Represents a link and is used e.g. in connection with fault management of internal links described more closely below with reference to FIG. 27.

InternalTrail 2314. This managed object class represents a "Trail" according to ITU-TS G803. It can only be included if InternalLayerNetwork is included, and an instance thereof is terminated, cf. the relation information at 2316, by an instance of a standard class 2318 TrailTerminationPoint TTP according to ITU-TS M.3100, that represents TTP "source", "sink" or "bidirectional" managed object classes in the relevant TP fragment. InternalLayerNetwork 2306 "points to", i.e. knows TTP 2318, cf. the relation 2319.

InternalSubnetwork 2320 included in the class 2302. This managed object class represents a subnetwork in a network element. An instance of this class can contain another instance of the same class, cf. the relation information 2322. This is due to the fact that recursive partitioning is supported by the class in question. The need for a recursive partitioning depends, as mentioned earlier, on the current network scenario. InternalSubnetwork contains InternalLink 2312.

InternalSubnetworkConnection 2324 included in the class 2320. An instance of the class 2324 is terminated by an instance 2336 of a standard class ConnectionTerminationPoint, CTP, that represents CTP "source", "sink" or "bidirectional" managed object classes in the relevant TP fragment.IInternalSubnetwork 2320 "points" to, i.e. knows CTP 2326, cf. the relation 2327. The managed object class 2324 represents a connection between termination points within subnetworks in a network element.

InternalLinkConnection 2328 is shown as included in the class InternalSubnetwork 2320 and being a member of the class InternalLink 2312. InternalLinkConnection 2328 can, however, as an alternative to the last mentioned relations, be included in the class 2312, cf. dashed line 2329. An instance of the class 2328 is likewise terminated by an instance of the standard class 2326. The managed object class 2328 represents a link connection within an internal link in a network element.

InternalNetworkNode 2330 included in the class 2320. This managed object class represents a subnetwork in a network element, said subnetwork however not being able to be partitioned further in smaller subnetworks, which are included in a network topology. In the class 2330 an instance 2331 of the standard class TerminationPoint is included that represents CTP/TTP "source", "sink" or "bidirectional" managed object classes in the relevant TP fragment.

InternalFabric 2332 included in the class 2330. This managed object class represents crossconnect functionality in a subnetwork which is represented by InternalNetworkNode according to the above. The crossconnect functionality of a remote switching unit which is connected to a central switching unit could e.g. be represented by this object class.

InternalRouting 2334 included in the class 2330. This class represents routing information for internal bearer service network nodes.

InternalCrossConnection 2336 included in InternalFabric 2332. This class represents a crossconnection between two termination points located in a subnetwork of the kind which according to the above is represented by InternalNetworkNode 2330 with crossconnect functionality in a network element. The object 2336 has the relation "crossconnect" to an instance 2337 of the standard class TerminationPoint, that represents CTP/TTP "source", "sink" or "bidirectional" managed object classes in the relevant TP fragment.

InternalTPpool in the case STM and InternalVPgroup (InternalVirtualPathgroup) in the case ATM 2338, both included in the class 2332, and in FIG. 23 represented by a common block 2338.

InternalTPpool represents a logical grouping of transport termination points in the internal transport network in a network element. The included termination points are equal members of a pool. This can be usable if (re)configuration is required of the routing information for the different internal crossconnection subnetworks in a network element. InternalTPpool can also represent a logical grouping of circuit termination points in the internal switched network. The included termination points are equal members of a pool. This ability can be usable if (re)configuration is required of routing information for the different internal switching subnetworks in a network element.

The object internalVPgroup is the counterpart of ATM to internalTPpool within IBSN. It represents the function to allocate ATM vc channels with a certain bandwidth (and QoS) on a given group of ATM vp links. In other words, this object is so different to the object class internalTPpool that it cannot be a specialization of this object class, which is only suited for bearer services of STM type. This implies that IBSN includes two different classes for allocation of channel resource, viz. InternalTPpool, that suits STM, and InternalVirtualPathGroup, that suits ATM. Both classes can be further specialized at need.

The object 2338 is a member of TerminationPoint 2337, cf. the relation 2340, and towards the same InternalLayerNetwork 2306 and InternalSubnetwork 2320 point, cf. the relations 2342 and 2344, respectively. Furthermore, the object 2338 terminates InternalLink 2312, the relation 2346. InternalRouting 2334 and InternalFabric 2332 have the relation "allocate channel", indicated at 2348 and 2350, respectively, to the object 2338. This relation means that the object is requested to allocate a channel, and gives in return information regarding the channel that has been selected, by a reference to an object that represents the channel in question.

Figure 24:
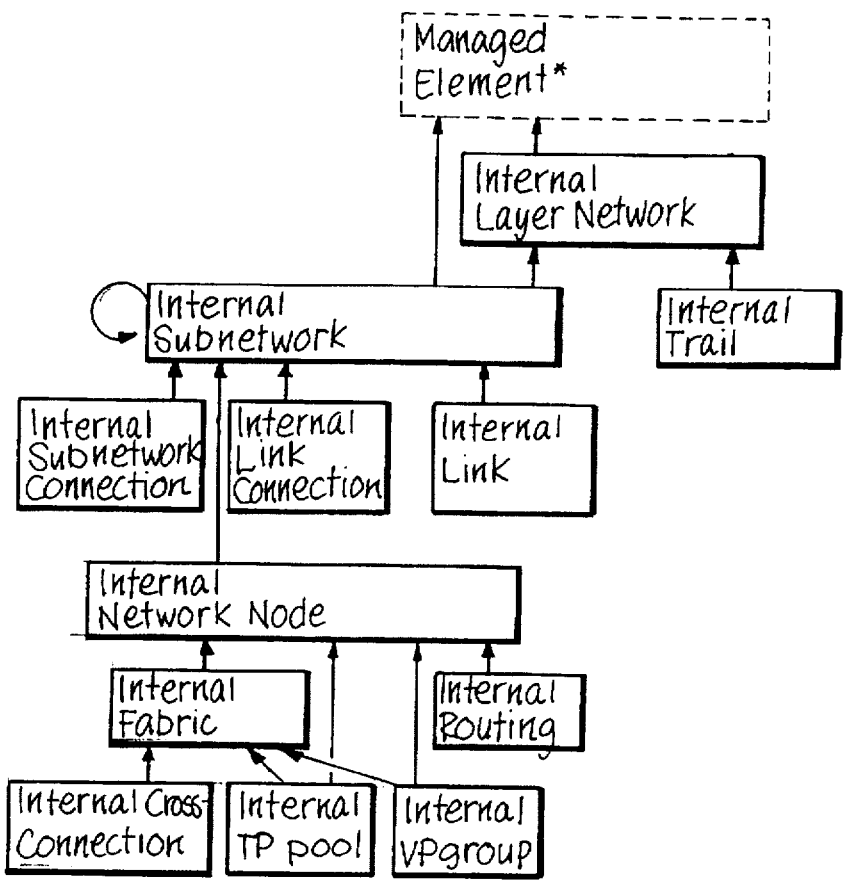
FIGS 24 and 25 show a naming and derivation hierarchy for the management information model according to FIG. 23.
Figure 25:
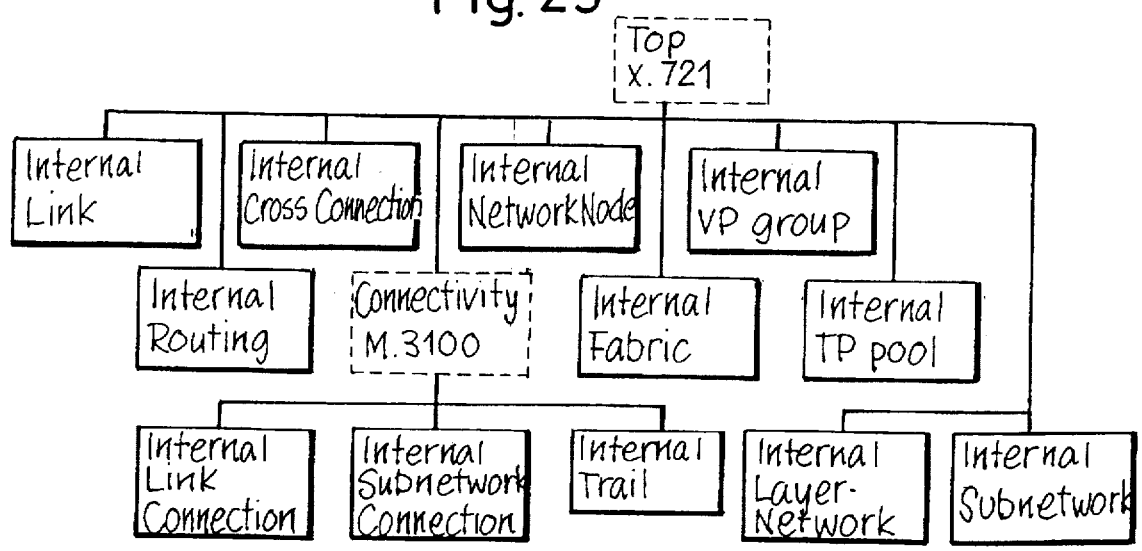

In FIGS. 24 and 25 namebinding and inheritance trees are shown for the IBSN fragment described with reference to FIG. 23.

Figure 26:
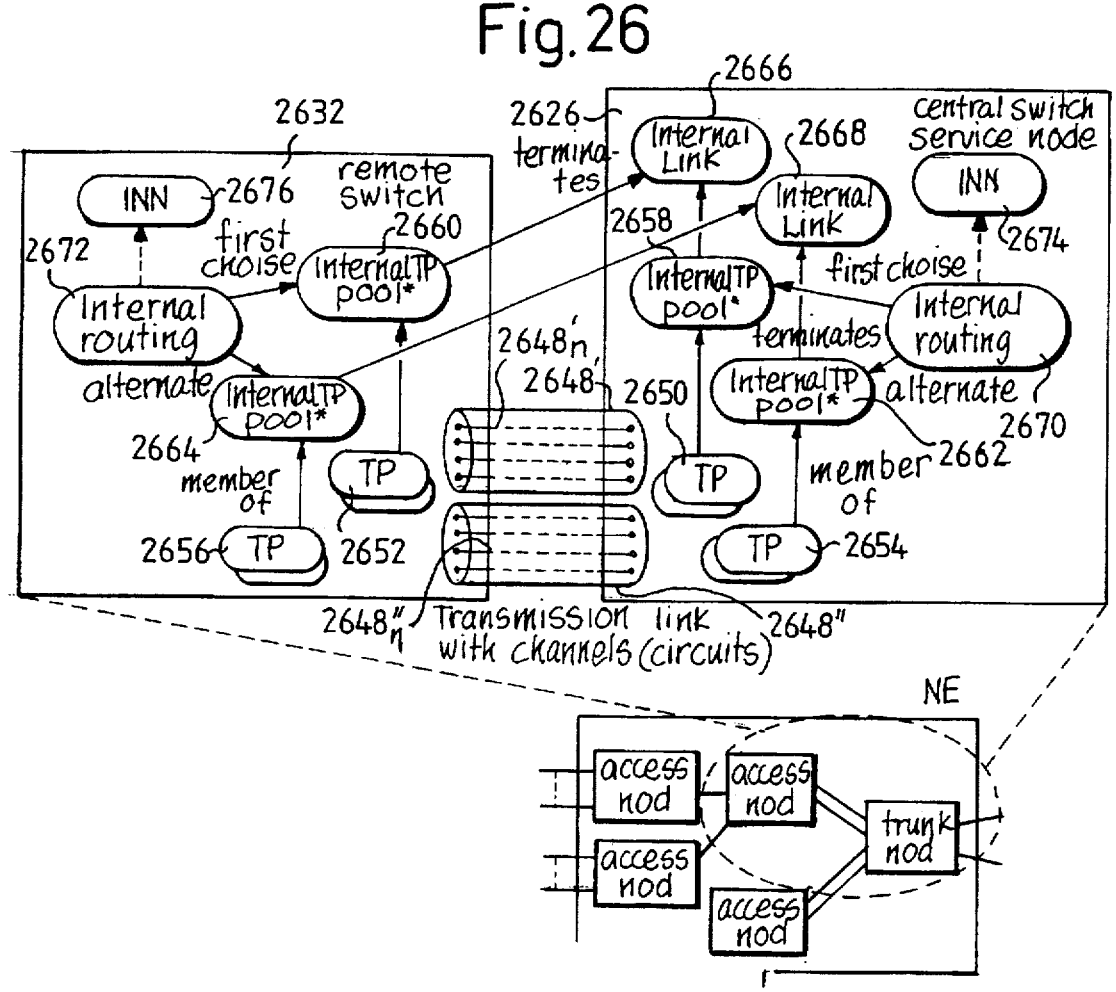
FIG. 26 shows an example of fault detection and alarm coordination in case of a link failure between two nodes included in network element according to FIG. 16.

With reference to FIG. 26 an example of fault detecting and alarm coordination in case of a failure on an internal link will be described, that shows the need of the managed object InternalLink. More particularly, a management view of the nodes 1626 and 1632 in FIG. 16 is shown, as indicated by the included picture below to the right in FIG. 26 and the dashed aiming lines extending from this picture. In FIG. 26 the same reference characters as in FIG. 16 are therefore used for the two nodes and the alternative links extending therebetween, except for the first digits, which in FIG. 26 are 26 in order to indicate the association with this Figure. In accordance therewith the nodes are designated 2626 and 2632, respectively, and the alternative links are designated 2648' and 2648". In FIG. 26 the two links 2648' and 26481" are indicated as including a plurality of channels 2648'$_n$ and 2648"$_n$, respectively. In the Figure there are also shown some of the resource representing managed objects.

Each connection endpoint of a channel 2648'$_n$ and 2648"$_n$, respectively, in the alternative links 2648' and 2648" is represented by an instance 2650, 2652 and 2654, 2656, respectively, of the managed object TerminationPoint. These instances are members of instances 2658, 2660 and 2662, 2664, respectively, of the managed object class InternalTPpool, that represents the termination of each an end on the links 2648' and 2648". At 2666 and 2668, respectively, there is shown each an instance of InternalLink, that represents the links 2648' and 2648", respectively, and thus have a relation to two InternalTPpool instances each. The nodes 2626 and 2632 furthermore each have an instance 2670 and 2672, respectively, of InternalRouting with a relation to the TPpool instances 2658, 2662 and 2660, 2664, respectively, and included in each an instance 2674 and 2676, respectively, of InternalNetworkNode.

One of the links 2648', 2648" can suddenly be non-available, e.g. due to the cable having been damaged in a roadwork. Due to this all TerminationPoint instances representing the channels of the faulty link will change operation state to "non-working" due to an alarm indication signal, said state of operation being defined in ITU-TS, X.731. Furthermore the corresponding TPpool instances will likewise change their state to "non-working" due to all their members, i.e. the TerminationPoint instances, taking the same state. Finally, also the corresponding object InternalLink will change its state of operation.

By an increase of abstraction in the management tree the operator can receive an alarm e.g. reading "link No. 1 out of operation due to external interruption on the transmission link. Alternative link No. 2 has been selected". Furthermore a reference can be given to one of the affected TerminationPoint objects and this reference can be used for analyzing more details in connection with the fault.

In order to cope with the scenario described above with reference to FIG. 26 the object InternalLink and the relation terminates is required between InternalTPpool and this object, as appears from FIG. 23.

With reference to an example appearing from FIGS. 27 and 28 the need of the managed objects internalTrail and internalLayerNetwork will now be described.

The object internalLayerNetwork represents a network element internal 'Layer network', defined in the ITU standard G803 (with the title 'Architectures of Transport Networks based on the SDH'), which is a network within a certain transport layer (e.g. atmvirtual path, atmvirtual channel or sdh multiplex section). The object internalTrail represents a connection which guarantees transparent transmission of user data between two access points to this network.

Figure 27:
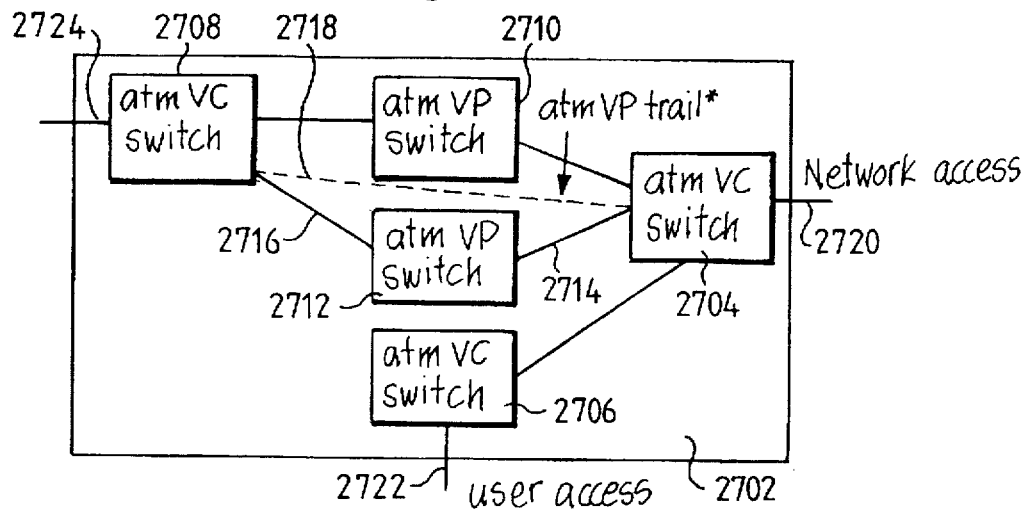
FIG. 27 shows a distributed atm vc crossconnect with an internal atm vp transport network as a reference configuration for describing two managed objects used according to the invention.

FIG. 27 shows an example of distributed atm vc crossconnect with an internal atmVP transport network in a network element 2702. The network element 2702 includes three nodes 2704, 2706 and 2708 including each an atmVC switch, and two nodes 2710 and 2712 including each an atmVP switch. The node 2712 has towards each of the nodes 2704 and 2708 an atmvP link connection 2714 and 2716, respectively. Between the nodes 2704 and 2708 an atmVC trail 2718 extends. This can carry 1–n atmVC link connections, i.e. an atmVPtrail within atmVP Layer Network corresponds to at least one atmVC link within atmvC Layer Network. A network access is shown at 2720 and user accesses at 2722 and 2724.

Figure 28:
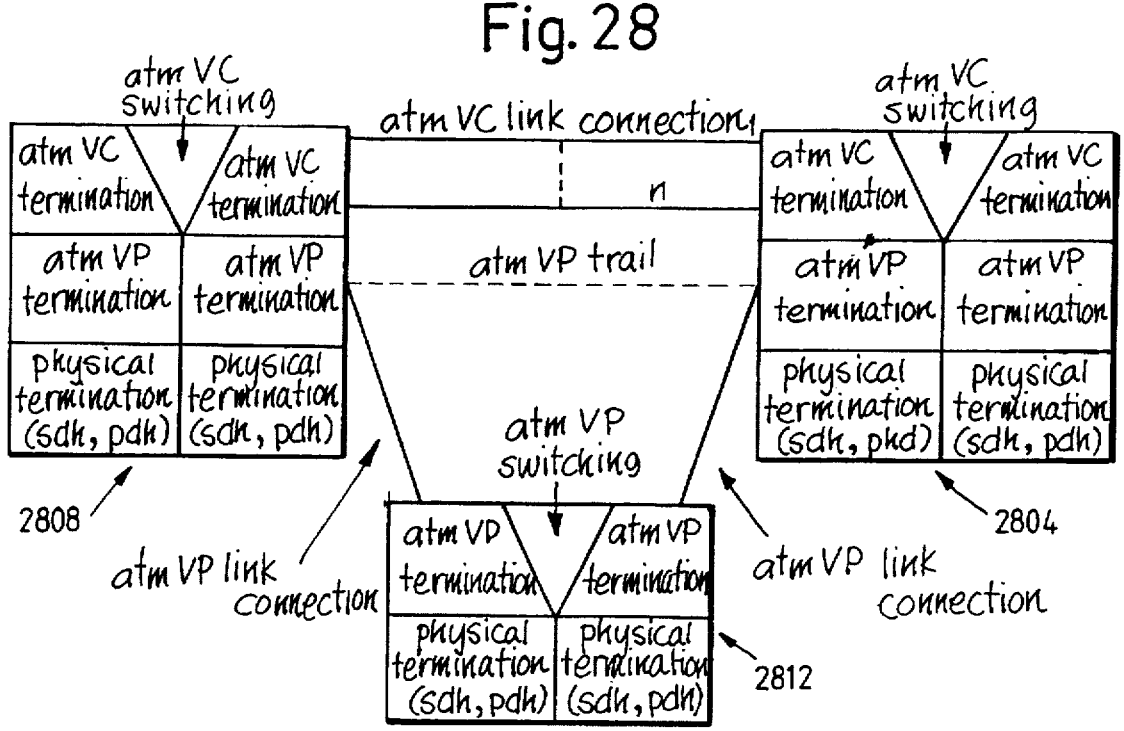
FIG. 28 shows a simplified "protocol view" of a section of the reference configuration according to FIG. 27.

FIG. 28 shows a simplified "protocol view" of a section of the reference configuration in FIG. 27. In FIG. 28 the blocks 2804, 2812 and 2808 represent the nodes 2704, 2712 and 2708, respectively.

For this Figure it should be added that the termination points of the atmVPtrail are represented by standardized managed objects of the type TrailTerminationPoint (TTP). The respective termination points of the link connections atmVP and atmVC are represented by standardized managed objects of the type ConnectionTerminationPoint (CTP). The internal atmVP trail between the two atmVC switches 2704 and 2708 are represented by the object atmVPinternalTrail. This is probably based upon the standardized object Trail. The network with the atmVP switches 2704, 2706 and 2708, atmVP link connections 2714 and 2716, and the 'access points' of the network which are of the type trail termination point, is denominated atmVP Layer Network according to ITU-T G803 standard. This network is represented by the object atmVPinternalLayerNetwork.

The operator can thus establish atmVPtrails by directing a demand towards the object atmvPinternalLayerNetwork. Furthermore the operator by means of the object trailterminationPoint specifies between which atmVP trail termination points this trail shall be established. As a result the network element responds with a reference to the object atmVPinternalTrail which represents the established internal trail.

The IBSN described with reference to FIGS. 23-26 is applicable both to switched and crossconnect applications, i.e. bearer services. In the following a number of examples of this will be described more closely.

Figure 29:
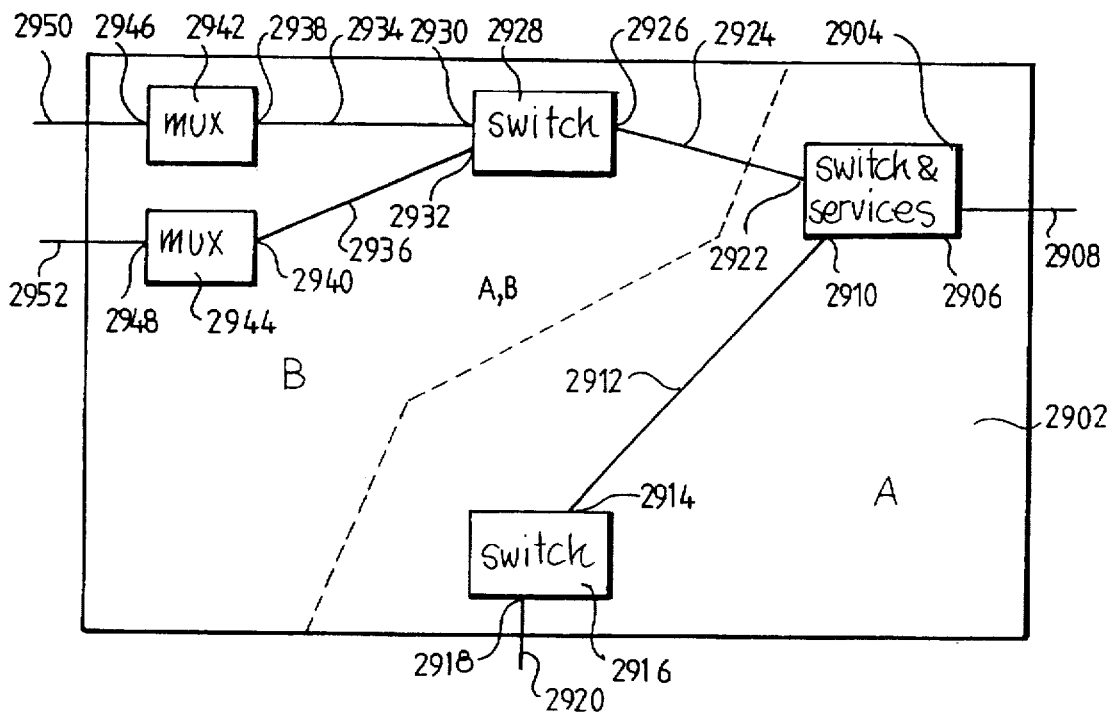

A first example relating to a crossconnect application is described with reference to FIGS. 29-38. As a reference configuration a network element according to FIG. 29 is chosen. To the generic denominations of managed objects described above with reference to FIG. 23 the prefix atm has been added for indicating that in the examples in question there is the question of the henceforth mentioned managed objects being atm-specific subclasses to the basic classes which are described with reference to FIGS. 23-25. These classes can e.g. comprise a system specific subtree of the standardized atmME management information tree. They can, however, also comprise a subtree to any other local root, e.g. a system specific one.

FIG. 29 shows a network element 2902 in the form of a distributed crossconnect exchange which includes a central switch and service node 2904 which via an 'internal channel' 2906 is connected to a network channel 2908. The channel 2906 represents the same physical channel as does the channel 2908. The difference resides in the addressing of their respective managed object instances as will be described more closely below. The node 2904 is via an internal channel 2910 and an interconnected link connection 2912 connected to an internal channel 2914 of a remote switch node 2916. The link connection 2912 can e.g. have a length of an order of magnitude of 20 km and the two nodes 2904 and 2916 be located in the same local district A. The node 2916 is via an internal channel 2918 connected to a user channel 2920. The channel 2918 represents the same physical channel as the channel 2920. The difference resides in the addressing of their respective managed object instances as will be described more closely below.

The node 2904 is furthermore via an internal channel 2922 and an interconnected link connection 2924 connected to an internal channel 2926 of a switch node 2928 which is located in another district B, a symbolic district border being indicated at AB. The link connection 2924 can e.g. have a length of an order of magnitude of 10 km. The node 2928 is furthermore via internal channels 2930 and 2932 and interconnected link connections 2934 and 2936, respectively, connected to internal channels 2938 and 2940, respectively, of two remote multiplexor nodes 2942 and 2944, respectively. The link connections 2934 and 2936 can e.g. have a length of an order of magnitude of 2 km. The multiplexor nodes 2938 and 2940 are via each an internal channel 2946 and 2948, respectively, connected to each a user channel 2950 and 2952, respectively. The channel 2946 represents the same physical channel as does the channel 2950. The difference resides in the addressing of their respective managed object instances as will be described more closely below.

In FIG. 29 the network channel 2908 and the user channels 2920, 2950 and 2952 form addressing points on the network element 2902 in a "black box" view. The 'internal' channels 2906, 2938, 2946 and 2948 in a "white box" view constitute both addressing points on the internal nodes 2904, 2916, 2942 and 2944, respectively, and terminating points for a set up call.

Figure 30:
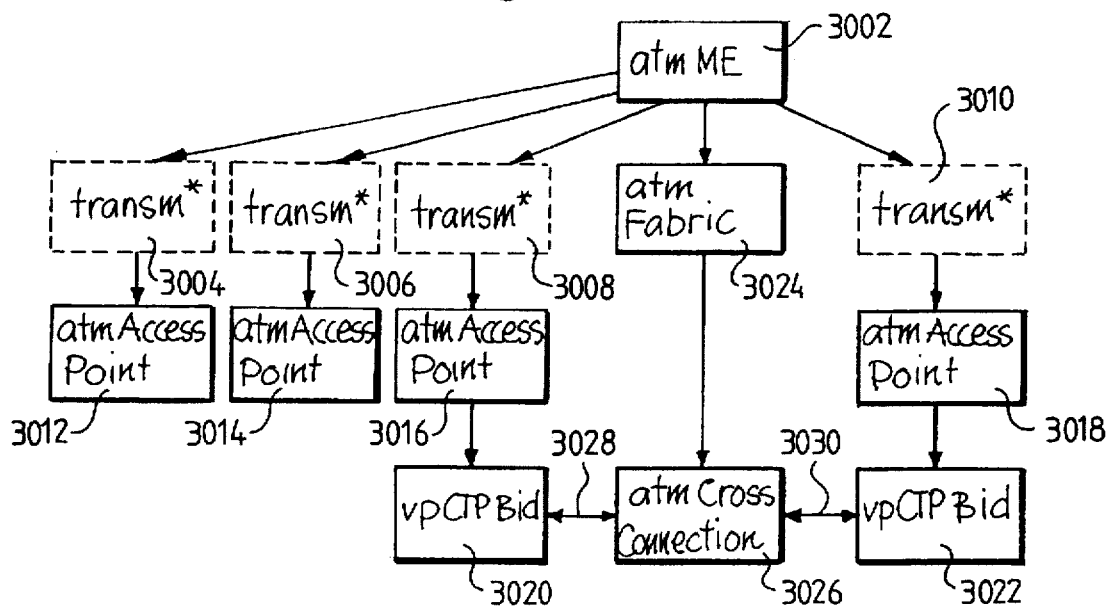
FIG. 30 shows a management tree according to ETSI standard for an ATM vp connection set up between a user channel and a network channel.

A service related managed object view of the configuration according to FIG. 29 is shown in FIG. 30, e.g. a "black box" view according to ETSI standard, to which reference is made in the publication ETS DE/N275-2210-Version 03 Helsinki 25-29 Apr. 94 "B-ISDN Management Architecture and Management Information Model for the ATM crossconnect". This view is used for normal set up of calls over a network of several network elements. More particularly, FIG. 30 shows a management tree when an ATM vp crossconnect is set up between the user channel 2920 and the network channel 2908.

The management tree in the root has an instance 3002 of the ATM specific managed object class atmME. As has been earlier mentioned "ATM specific managed object class" in the present connection and further on means a class, the objects of which are closely described in the above mentioned publication. This description need therefore not be repeated here. The class atmME contains objects for i.a. SDH termination, of which instances are indicated at 3004, 3006, 3008 and 3010, which represent each a part of the internal network in the network element 2902 for establishing connection to the user channels 2950, 2952, 2920 and the network channel 2908, respectively. The instances 3004, 3006, 3008 and 3010 contain each an instance 3012, 3014, 3016 and 3018, respectively, of the ATM specific managed object class atmAccessPoint. The instances 3016 and 3018 contain each an instance 3020 and 3022, respectively, of the ATM specific managed object class vpCTPBid.

The instance 3002 of the managed object class atmME contains an instance 3024 of the ATM specific class atmFabric. The instance 3024 in turn contains an instance 3026 of the ATM specific class atmCrossConnection. The crossconnection between the user channel 2920 and network channel 2908 is represented by double arrows 3028 and 3030 between, on the one hand, the vpCTPBid instance 3020 and the atmCrossConnection instance 3026, and on the other hand, the vpCTPBid instance 3022 and the atmCrossConnection instance 3026.

Figure 31:
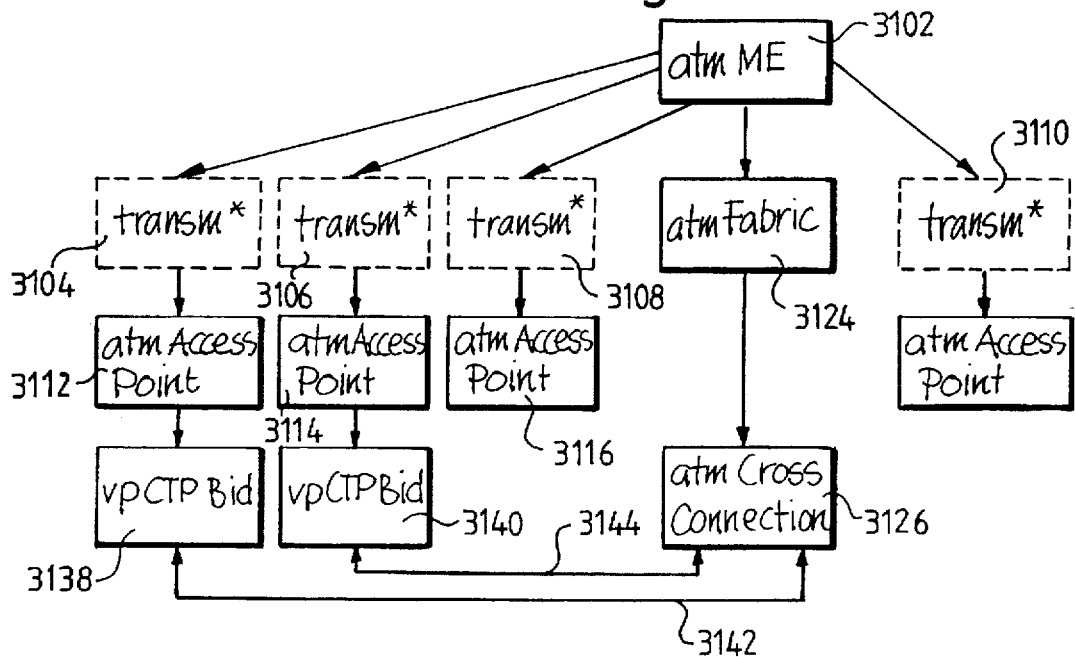
FIG. 31 shows a management tree according to ETSI standard for an ATM vp connection set up between two user channels.

FIG. 31 shows a management tree when a connection is instead established between the user channels 2950 and 2952. The reference characters in FIG. 31 of the same object instances as in FIG. 30 differ from those in FIG. 30 by the two first digits, which are the same as the respective Figure number.

The atmAccessPoint instances 3112 and 3114 contain each a vpCTPBid instance 3138 and 3140, respectively. The crossconnection between the user channels 2950 and 2952 is represented by double arrows 3142 and 3144 between, on the one hand, the vpCTPBid instance 3138 and the atmCrossConnection instance 3126, and on the other hand the vpCTPBid instance 3140 and the atmCrossConnection instance 3126.

In the following there are described a number of examples of a "white box" view of the configuration according to FIG. 29. This "white box" view starts from management based upon the management information model described above with reference to FIG. 23, and is used in case of local operational cases such as installation configuration, test of part connections within the network element, supervision (faults and statistics) on such part connections. From the examples it appears that several degrees of freedom exist in the configuration. The selection of these depends upon the operator's specific demands on the cases of operation above.

Figure 32:
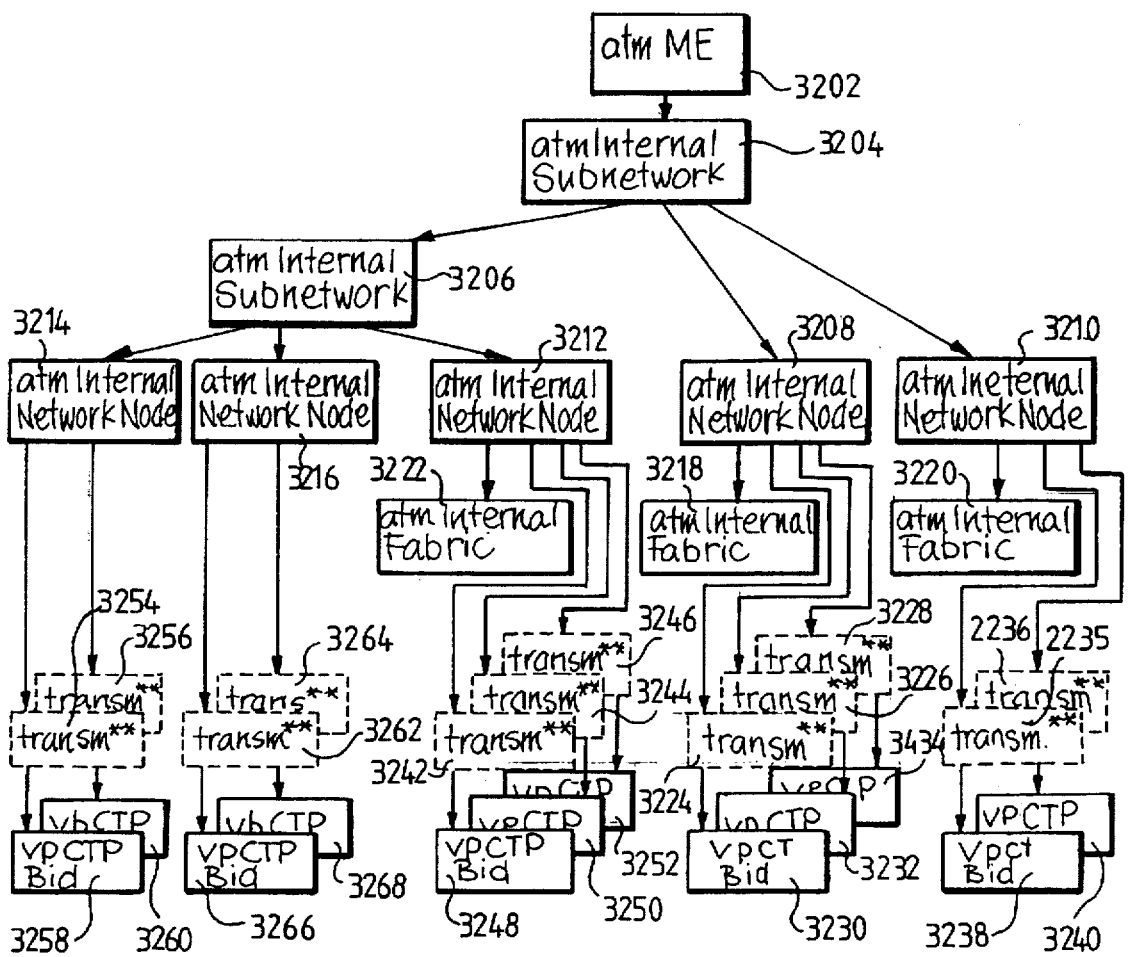
FIG. 32 shows a management tree for the internal network of the network element according to FIG. 29, focusing on addressing of internal channels.

FIG. 32 shows a management tree for a case in which an operator will be able to group-address the different internal channels in the network element 2902 after geographical position. The tree contains, if nothing else is said, instances of managed object classes included in the management information model according to FIGS. 23–26.

The root of the tree consists, as in the preceding cases, of an instance 3202 of the ATM specific managed object class atmME. This instance contains and instance 3204 of the class atmInternalSubnetwork, which represents the whole internal network included in the network element 2902, said network covering the districts A and B. The instance 3204 in turn contains a further instance 3206 of the class atmInternalSubnetwork representing the portion of the internal network covering the district B.

The instance 3204 furthermore contains two instances 3208 and 3210 of the managed object class atmInternalNetworkNode, which represent the nodes 2904 and 2916. The instance 3206 contains three instances 3212, 3214 and 3216 of atmInternalNetworkNode, which represent the nodes 2928, 2944 and 2942, respectively. The instances 3208, 3210 and 3212 contain each an instance 3218, 3220 and 3222, respectively, of the managed object class atmInternalFabric.

The instance 3208 furthermore contains managed object instances for i.a. SDH termination and internal interface, which are represented by dashed blocks 3224, 3226 and 3228, which in turn contain each an instance 3230, 3232 and 3234, respectively, of the ATM specific managed object class vpCTPBid, one for each of the internal channels 2906, 2922 and 2910, respectively.

The instance 3210 furthermore contains managed object instances for i.a. SDH-termination and internal interface, which are represented by dashed blocks 3235 and 3236, which in turn contain each an instance 3238 and 3240, respectively, of the ATM specific managed object class vpCTPBid, one for each of the internal channels 2918 and 2914, respectively.

The instance 3212 furthermore contains managed object instances for i.a. SDH-termination and internal interface, which are represented by dashed blocks 3242, 3244 and 3246, which in turn contain each an instance 3248, 3250 and 3252, respectively, of the ATM specific managed object class vpCTPBid, one for each of the internal channels 2926, 2930 and 2932, respectively.

The instance 3214 furthermore contains managed object instances for i.a. SDH-termination and internal interface, which are represented by dashed blocks 3254 and 3256, which in turn contain each an instance 3258 and 3260, respectively, of the ATM specific managed object class vpCTPBid, one for each of the internal channels 2938 and 2946, respectively.

The instance 3216 furthermore contains managed object instances for i.a. SDH-termination and internal interface, which are represented by dashed blocks 3262 and 3264, which in turn contain each an instance 3266 and 3268, respectively, of the ATM specific managed object class vpCTPBid, one for each of the internal channels 2940 and 2948, respectively.

In FIG. 32 the operator has thus selected to configure the installation so that the nodes 2928, 2942 and 2944 are included in an own subnetwork which in turn is included in a greater subnetwork. The later covers also the two further nodes 2904 and 2916. The reason for this configuration can e.g. be that they belong to different districts, and there is a desire to point particularly to the nodes and the internal channels of the district B. More particularly, the internal channels in the area B can thereby easily be addressed as a whole via the instance 3206 by atmInternalSubnetwork. Contrary thereto the internal channels in the area A must be addressed for each node 2904 and 2916 separately.

If there is no reason to point particularly to one each of some internal nodes, a flat structure can instead be configured. In such a case the nodes 2928, 2942 and 2944 are directly ranged under the instance 3204.

A third possible configuration can be to also represent the nodes of the district A with an own subnetwork which is included in the same subnetwork under the instance 3204 as is the subnetwork of the district B.

Figure 33:
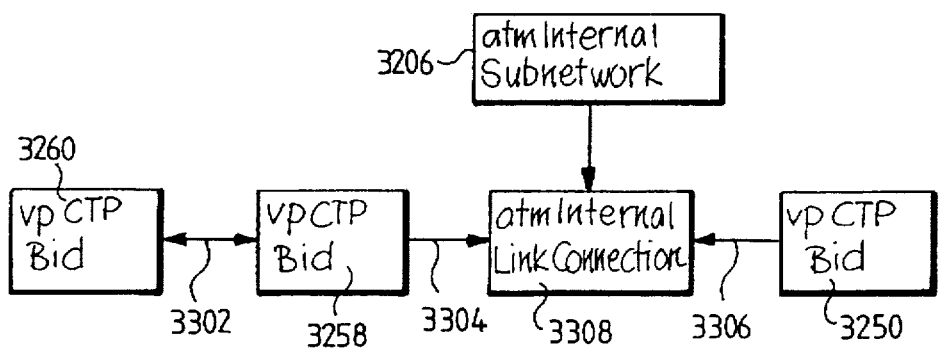
FIG. 33 shows a section of the management tree of FIG. 23, that shows fixed multiplexing of one internal channel to another one, and a fixed link connection between two internal channels belonging each to its particular node.

FIG. 33 shows a section of the management tree in FIG. 23, which illustrates fixed multiplexing of the internal channel 2946 to the internal channel 2938, and a fixed link connection between the internal channels 2938 and 2930.

The fixed multiplexing of the channel 2946 to the channel 2938 is represented by the fact that the object instance 3260 which represents the channel 2946 has the relation 'connectedTo' to the object instance 3258 which represents the channel 2938 and conversely, according to a double arrow 3302. The object instances 3258 and 3250 in turn have the relation 'terminates', according to arrows 3304 and 3306, respectively, to an object instance 3308 of the class atmInternalLinkConnection which represents an ATM vp connection over the transmission link between the nodes 2928 and 2942.

Figure 34:
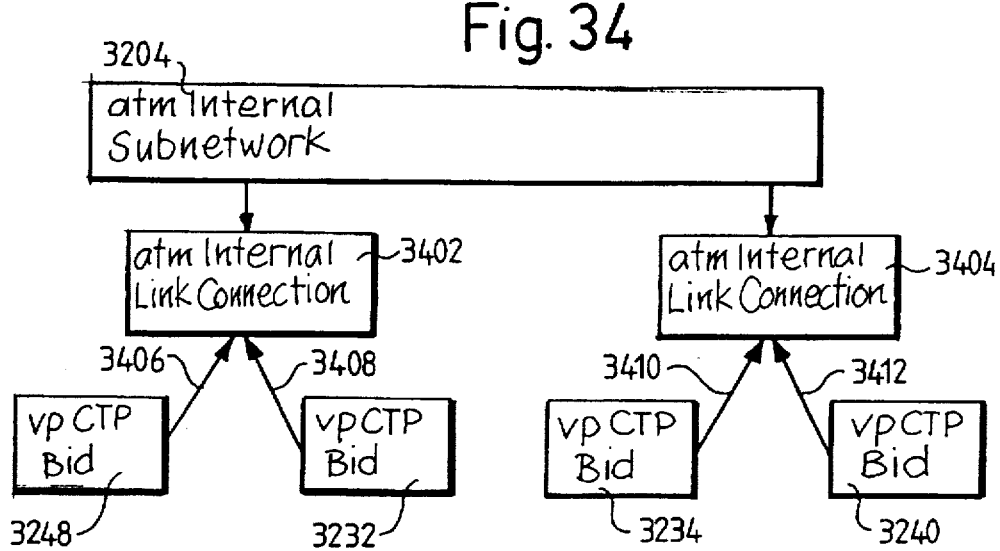
FIG. 34 shows a section of the management tree in FIG. 23, showing link connections between three nodes.

FIG. 34 shows another section of the management tree according to FIG. 23 which indicates link connections between the nodes 2928, 2904 and 2916. The instance 3204 of atmInternalSubnetwork contains two instances 3402 and 3404 of the class atmInternalLinkConnection. The object instances 3248 and 3232 have the relation 'terminates' according to arrows 3406 and 3408, respectively, to the instance 3402 which represents an ATM vp connection over the transmission link between the nodes 2904 and 2928. The object instances 3234 and 3240 have the relation 'terminates' according to arrows 3410 and 3412, respectively, to the instance 3404 which represents an ATM vp connection over the transmission link between the nodes 2904 and 2916.

Figure 35:
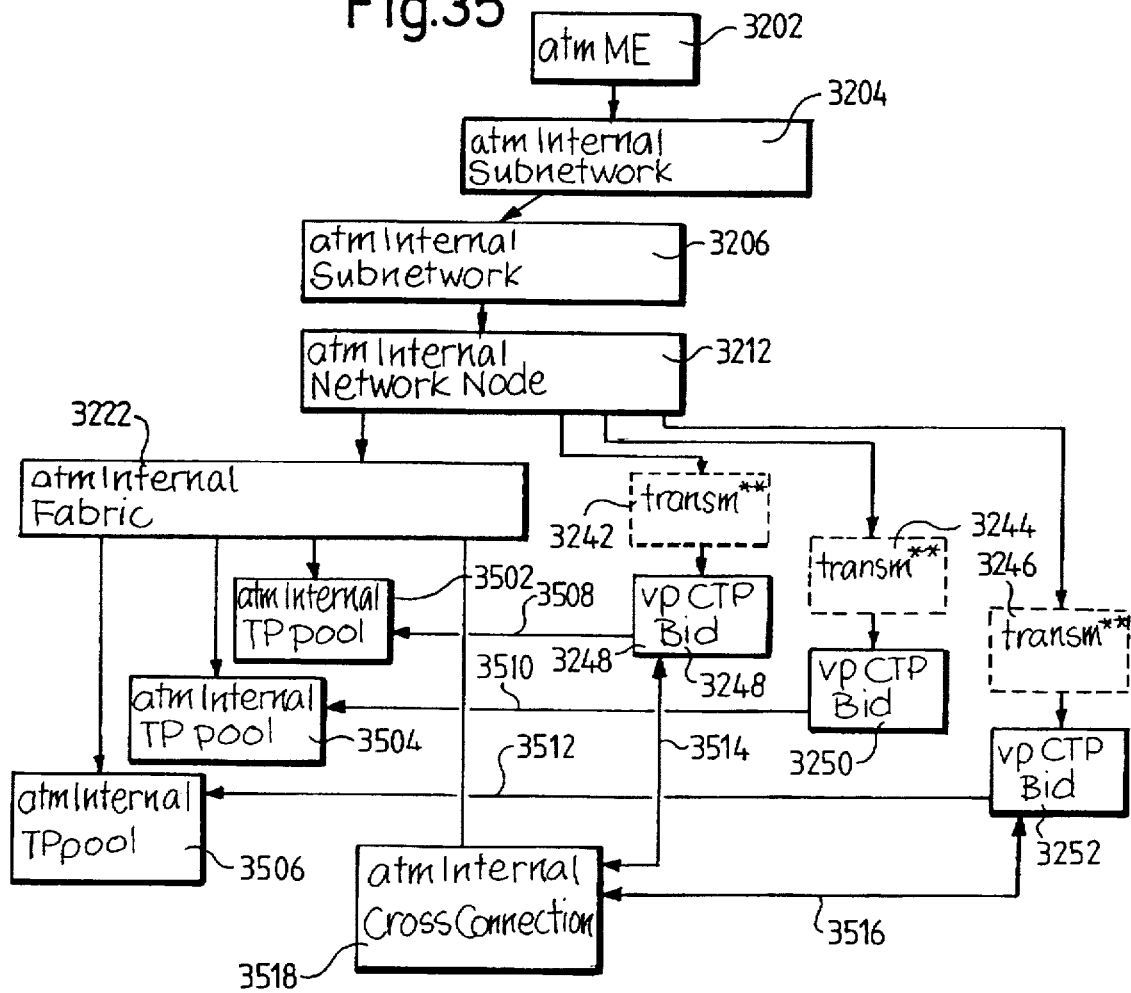
FIG. 35 shows a section of the management tree in FIG. 23, showing a managed object model of an established ATM vp crossconnection between two internal channels.

With reference to FIG. 35 it will now be exemplified how internal ATM vp crossconnections can be set up starting from the configuration on FIG. 23. It is now suitable to introduce objects of the class atmInternalTPpool which group a number of vpCTPBid which are all equal from the point of view of routing (the same QoS and destination). The destination should be defined by one of the attributes of an atmInternalTPpool object. For the object in question to be meaningful it is furthermore assumed that each internal channel, as well as user channel and network channel, only is the first channel in a group, e.g. containing 30 channels, of equal such ones. This implies in the present case that the operator shall configure these atmInternalTPpool objects to the nodes 2904, 2928 and 2916. The nodes 2942 and 2944 are only multiplexors which cannot establish calls controlled from an operator, i.e. a given input channel is fixedly connected to a given output channel. With these given conditions the operator shall configure three instances of atmInternalTPpool for the node 2904, three for the node 2928, and two for the node 2916. These objects are created by means of atmInternalFabric, which represents the cross-connect functionality in the respective internal node. For the sake of clearness, and since according to that stated below, the example according to FIG. 35 is only intended to deal with the node 2928. FIG. 35 only contains the part of the tree in FIG. 23, which relates to the node 2928. However, the internal channels 2946 and 2938, as well as 2948 and 2940, are two way fixedly connected to each other.

Based upon that said above the instance 3222 of atmInternalFabric contains three instances 3502, 3504 and 3506 of atmInternalTPpool, of which the instances 3248, 3250 and 3252, respectively, of vpCTPBid are members, according to arrows 3508, 3510 and 3512, respectively.

The example according to FIG. 35 now starts from the presumption that the operator desires to establish a test connection over the node 2928. The reason for this can be that this node is suspected to give bad transmission properties, e.g. many lost ATM cells.

At the establishment of the connection in FIG. 35 the operator controls the instance 3222 of atmInternalFabric. To the instance a control instruction is sent in which two endpoints are designated, in the present case those represented by the instances 3248 and 3252 of vpCTPBid, which shall be interconnected by means of a crossconnection. The operator can choose between either designating a single channel or only a group of equal channels, via atmInternalTPpool. If the later alternative is chosen, the network element itself will choose a channel in this group and inform the operator of which channel that has been chosen, at confirmation that the connection has been set up. The connection thus established in the present case is represented by double arrows 3514 and 3516 between each of the vpCTPBid instances 3248 and 3252, respectively, on the one hand, and an instance 3518 of atmInternalCrossConnection, on the other hand, that is included in the instance 3222 of atmInternalFabric.

A case of establishing a crossconnection over several internal nodes will now be described here. The case is based upon the presumption that the operator desires to establish an ATM vp crossconnection between the internal channels 2930 and 2918, i.e. over the nodes 2928, 2904 and 2916. Of course, this can be done in three steps, i.e. a control instruction is sent to the instance of atmInternalFabric of the respective node. If instead the subnetwork structure configured in FIG. 29 is used, the number of control instructions can be reduced to one or maximally two ones. To be able to describe this, the configuration must at first be supplemented with the relations shown in FIG. 36. The channels/channel groups which shall be visible on a subnetwork level will be so by creating the relation 'pointsTo' from the respective subnetwork to the respective channel/channel group.

Figure 36:
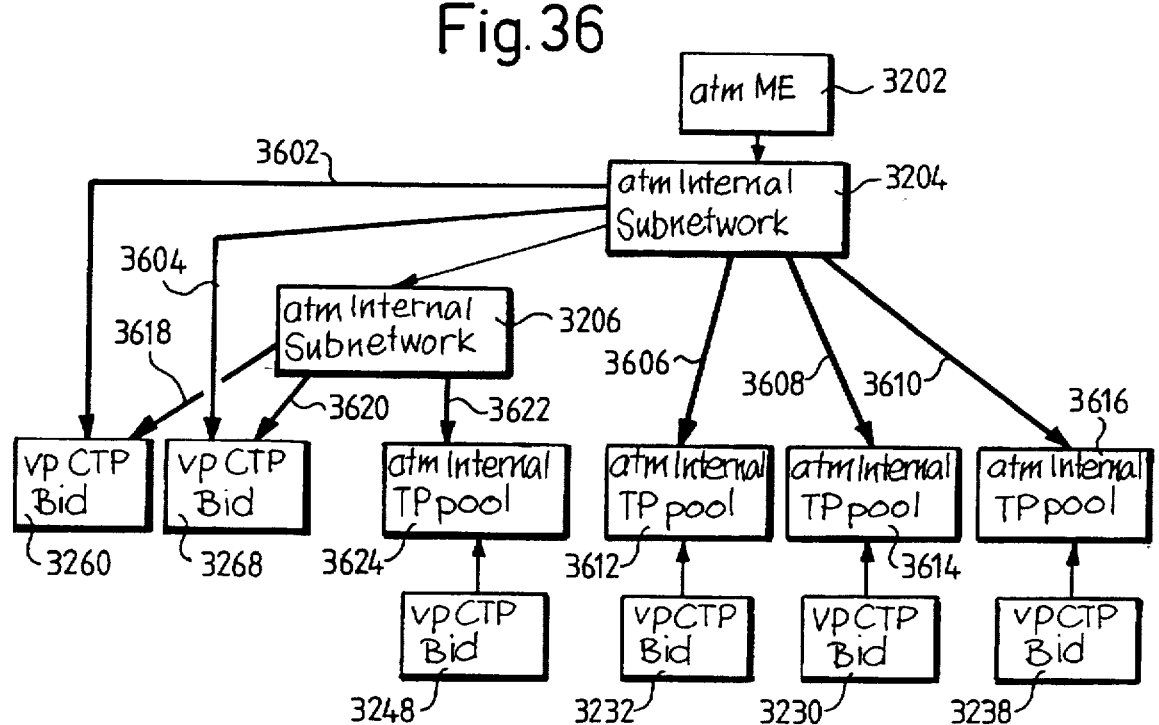

In the example it is assumed that the operator chooses to make visible the channels, or the corresponding channel group, 2946, 2948, 2922, 2906, 2920 for the subnetwork represented by the instance 3204 of atmInternalSubnetwork. This is shown in FIG. 36 by arrows 3602, 3604, 3606, 3608 and 3610, respectively, which represent the above mentioned relation 'pointsTo', and extend from the instance 3204 to the respective instance 3260 and 3268 of vpCTPBid, and to the respective instance 3612, 3614, 3616 of atmInternalTPpool, which contains each its corresponding instance 3232, 3230 and 3238, respectively, of vpCTPBid. The reason for the internal channel 2922 being made visible is that it adjoins another subnetwork.

For the second subnetwork represented by the instance 3206 of atmInternalSubnetwork the channels 2946, 2948, 2926 are made visible. This is shown in FIG. 36 by arrows 3618, 3620 and 3622, which represent the relation 'pointsTo', and extend from the instance 3206 to the respective instance 3260 and 3268 of vpCTPBid, and to an instance 3624 of atmInternalTPpool, that contains the instance 3248 of vpCTPBid.

Figure 37:
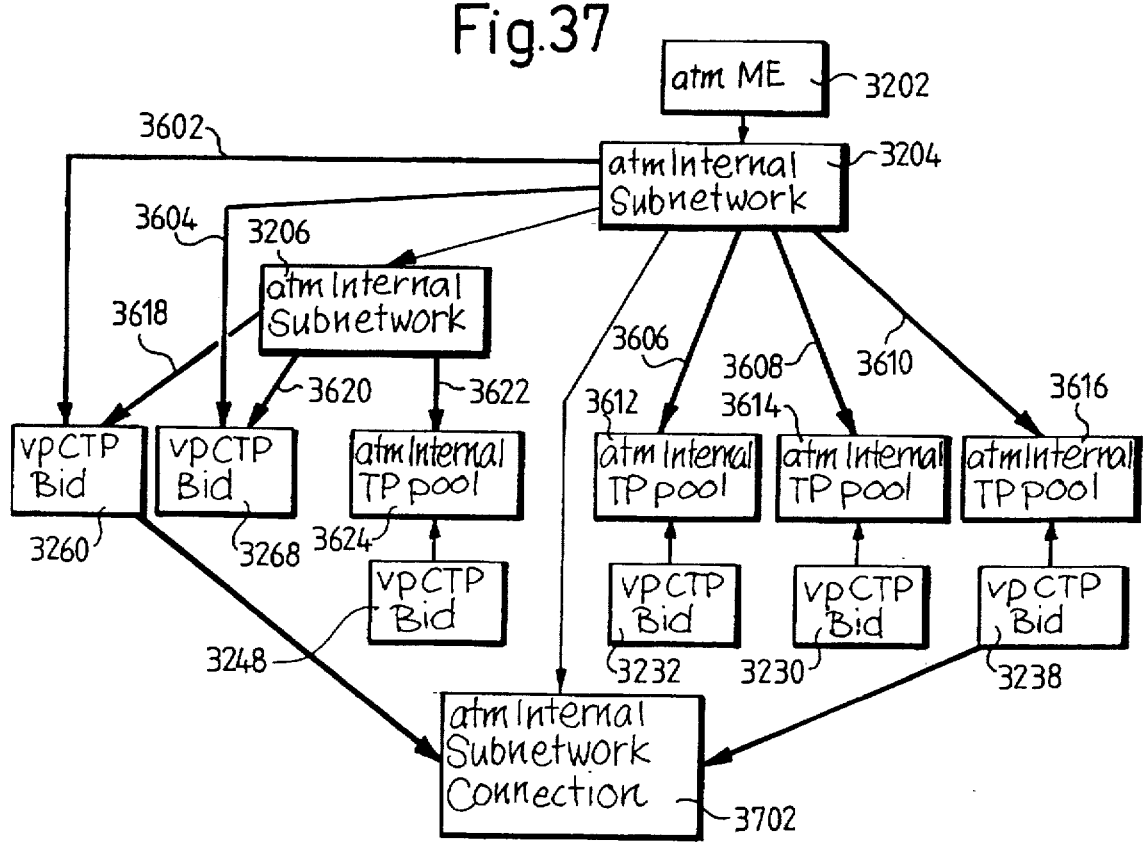
FIGS. 37 and 38 show a managed object model each of each an example of such crossconnections.

The operator knows that the node 2942 is a multiplexor which has the channel 2946 fixedly connected to the channel 2938, and that this in turn according to FIG. 37 is connected to the channel 2930 via a transmission link. He furthermore knows that according to FIG. 32 the channels 2926 and 2910 are connected to the channel 2922 and the channel 2914, respectively, via transmission links. This implies that the connection can be established by sending only one control instruction to the instance 3204 of atmInternalSubnetwork with the addresses to channels 2946 and 2920 as parameters. This subnetwork represented by the instance 3204 will establish a connection over the three nodes 2928, 2904 and 2916.

This implies that a complete connection has been established between the channels 2946 and 2920 via the channel 2930. With reference to FIG. 37 this connection is represented by an instance 3702 of the managed object class atmInternalSubnetworkConnection contained in atmInternalSubnetwork, the instances 3260 and 3238 of vpCTPBid having the relation 'terminates' to this instance.

Figure 38:
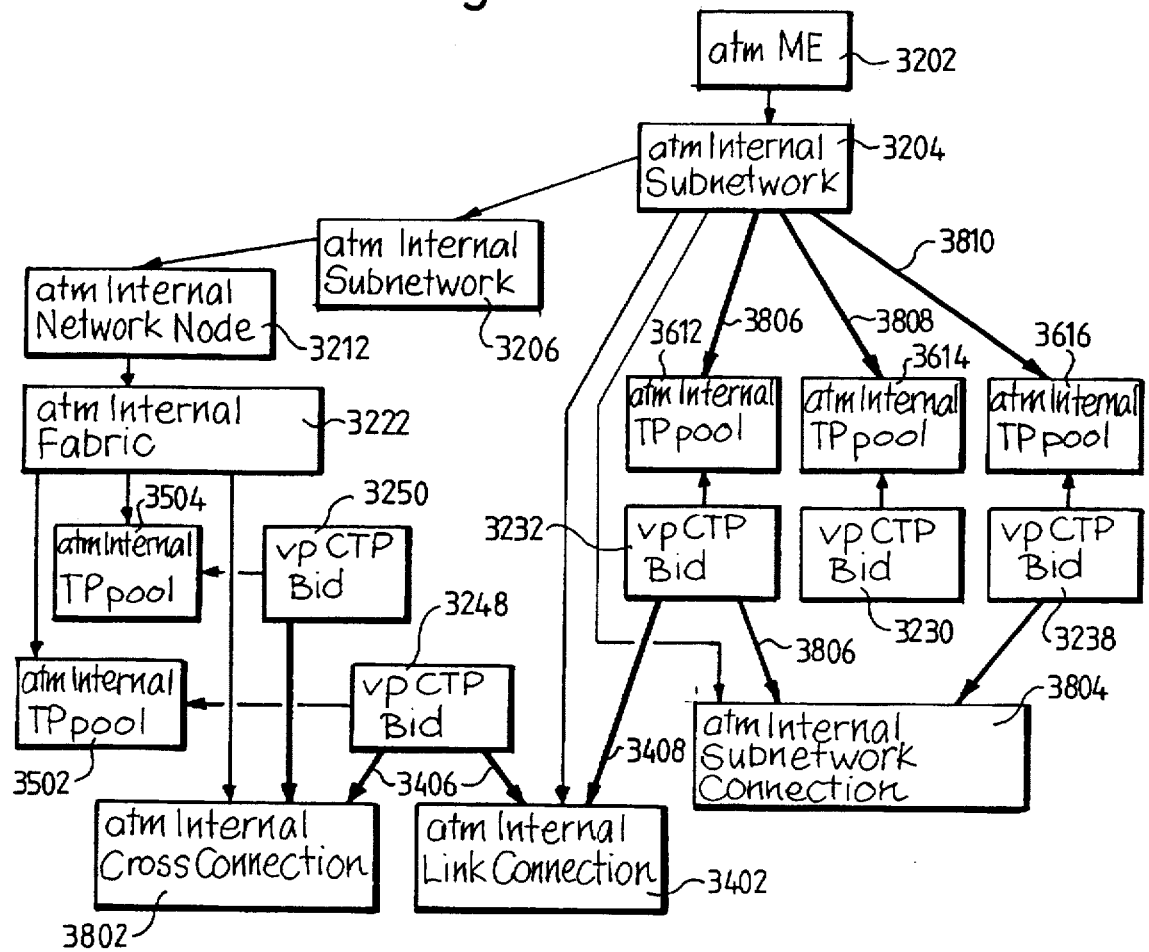

If it is instead assumed that the operator does not know that the channel 2946 is connected to the channel 2930 via fixed multiplexing and transmission, the operator must set up the connection in two steps. The operator must at first "open up" the subnetwork represented by the instance 3206 for making the channel 2930 visible, cf. the instance 3260 of vpCTPBid in FIG. 37, which represents this channel. With reference to FIG. 38 the operator in the first step establishes a connection, represented by an instance 3802 of atmInternalCrossConnection included in the instance 3222 of atmInternalFabric, between the internal channels 2930 and 2926 represented by the vpCTPBid instances 3250 and 3248 over the node 2928. This is done in the same way as has been described more closely above with reference to FIG. 37 for the connection between channels 2932 and 2926 over the node 2928, in question.

Then, in step 2, a subnetwork connection is set up, represented by an instance 3804 of atmInternalSubnetworkConnection included in the instance 3204 of atmInternalSubnetwork, from the internal channel 2922 of the node 2904, said channel being represented by the vpCTPBid instance 3232, to the internal channel 2920 of the node 2916, said channel being represented by the vpCTPBid instance 3238. The arrows 3806 and 3808 represent the relation 'terminates'.

The connection represented by the instance 3402 of atmInternalLinkConnection between the internal channel 2926 of the node 2928 and the internal channel 2922 of the node 2904 is set up as described above with reference to FIG. 34, where the arrows 3406 and 3408 represent the relation 'terminates'.

In the following use of internal bearer service network fragments according to the invention, IBSN, will be described more closely for switched applications. As a reference configuration a network element according to FIG. 39 with a "black box" view according to FIG. 40 and a standardized managed object model according to FIG. 41 is chosen.

Figure 39:
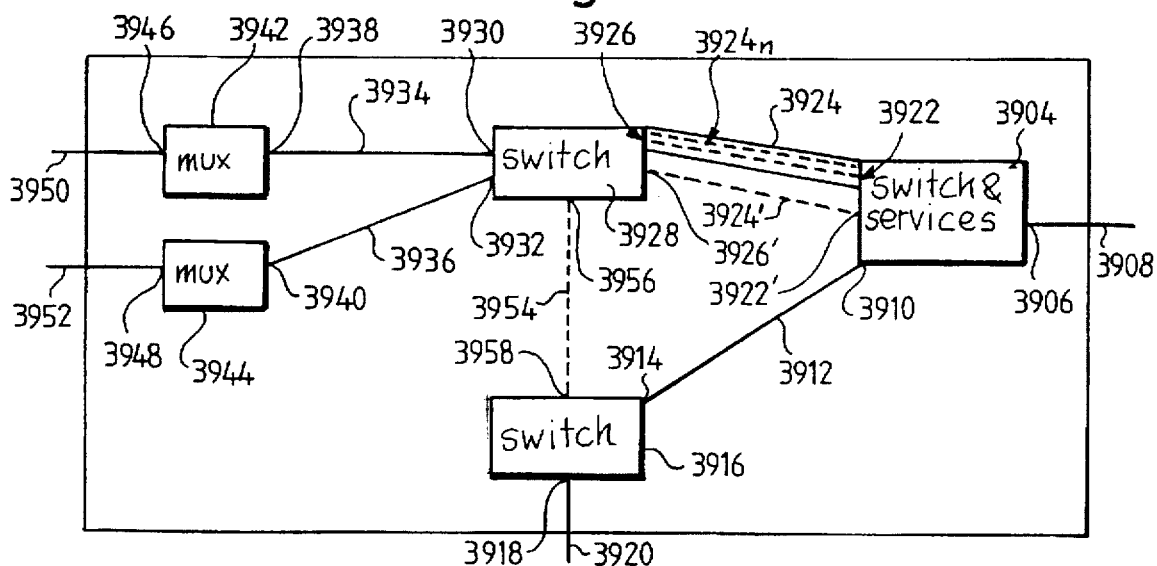
FIG. 39 shows a network element in the form of a distributed B-ISDN switch with alternative internal links.

In FIG. 39 a network element 3902 is a distributed B-ISDN switch which includes a central switch and service node 3904 which via an internal channel 3906 is connected to a network channel 3908. The node 3904 is via an internal channel 3910 and an intermediate link connection 3912 connected to an internal channel 3914 of a remote switch node 3916. The node 3916 is via an internal channel 3918 connected to a user channel 3920.

The node 3904 is furthermore via an internal channel 3922 and an intermediate first hand link 3924, that contains a number of link connections indicated at $3924_n$, connected to an internal channel 3926 of a switch node 3928. The node 3928 is furthermore via internal channels 3930 and 3932 and intermediate links 3934 and 3936, respectively, connected to internal channels 3938 and 3940, respectively, of two remote multiplexor nodes 3942 and 3944, respectively. The multiplexor nodes 3938 and 3940 are via each an internal channel 3946 and 3948, respectively, connected to each a user channel 3950 and 3952, respectively.

An alternative link 3924' between internal channels 3926' and 3922' of the nodes 3928 and 3904, respectively, is used in case of a fault only on the first hand link 3924. An alternative link 3954 between internal channels 3956 and 3958 of the nodes 3928 and 3916, respectively, is used in case of faults on both links between node2 and node1 or in case of a fault on the link 3912 between the nodes 3904 and 3916.

Figure 40:
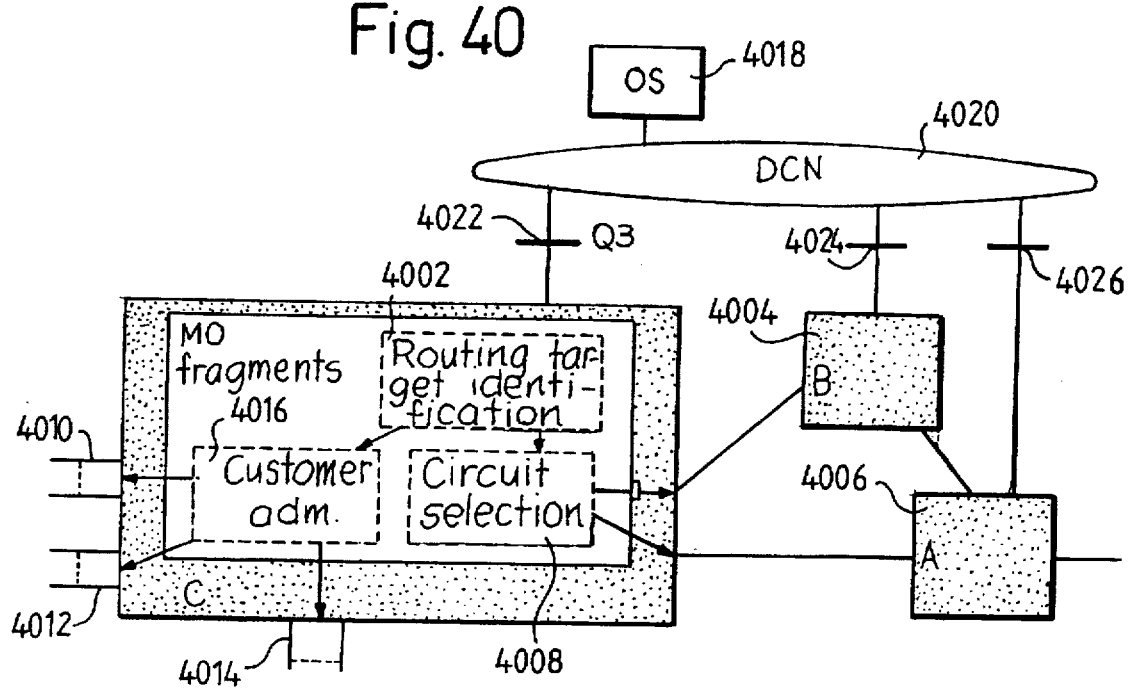
FIG. 40 shows a standardized service related "black box" view of routing information for the network element according to FIG. 39.
Figure 41:
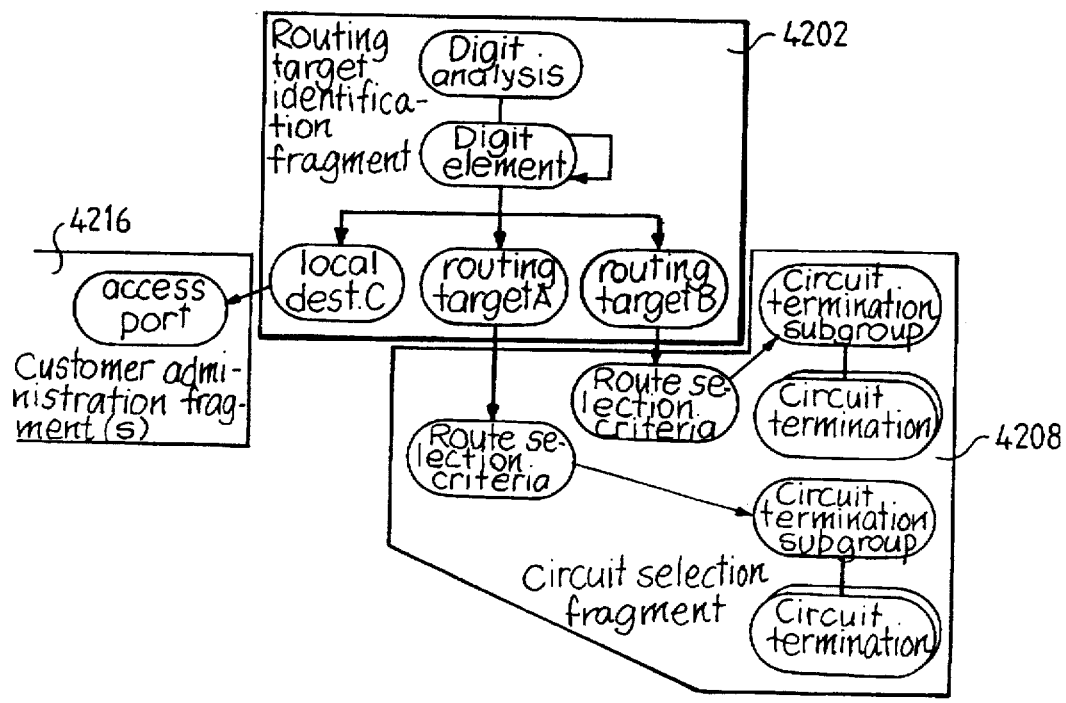
FIG. 41 shows a simplified managed object model of the routing information according to FIG. 40.

A service related managed object view of the switch according to FIG. 39 is shown in FIG. 40, i.e. a "black box" view according to ETSI standard for illustrating management of routing information, subscriber and subscriber line information.

With reference to FIG. 40 this "black box" view includes a destination identifying fragment 4002, 'Routing target identification', that identifies two switches 4004 and 4006 for national and international calls, respectively. The designations B and A in the respective blocks 4004, 4006 indicate B and A number, respectively. The corresponding circuit selection fragment, 'Circuit selection', is shown at 4008. Also a great number of local destinations and access ports, of which some are indicated at 4010, 4012 and 4014, are identified for the terminating calls to the connected subscriber. Corresponding fragments for subscriber data administration, 'Customer administration', is shown at 4016.

FIG. 40 also shows an operations system 4018 which via a data communication network 4020 and a Q interface 4022 communicates with the network element, as well as via interfaces 4024 and 4026 with exchanges 4004 and 4006, respectively. The concepts 'Routing target identification', 'Circuit selection' and 'Customer administration' are according to the ETSI standard.

In FIG. 41 there is shown a simplified managed object model according to N-ISDN standard of the routing information which is used in the view according to FIG. 40. For B-ISDN there is still no standard, but probably the basic structure will be the same. B-number analysis is made in the destination identifying fragment 4002. Further analysis is made in the circuit selection fragment 4008 such as selection of route (based i.a. on signalling and bearer service attributes). The principles for selection of channel (circuit switched link connection) within the route ('route'), will, however, be different in the case of B-ISDN. Circuit switched link connections (circuits) in the ATM case correspond to virtual channel connections (ATM vc connection). Resource allocation, such as bandwidth, for these is performed for each establishment of a connection. The ATM (vc) channels are allocated on ATM 'virtual path' groups, which represent configured groups of ATM (vp) links between the network elements. The designations of managed objects within oval blocks used in the Figure are according to N-ISDN standard, cf. e.g. Interim ETSI standard I-ETS 300 292, DI/NA-43310, October 1993, "Functional Specification of call routing information management on the Operations System/Network Element (OS/NE) interface".

Figure 42:
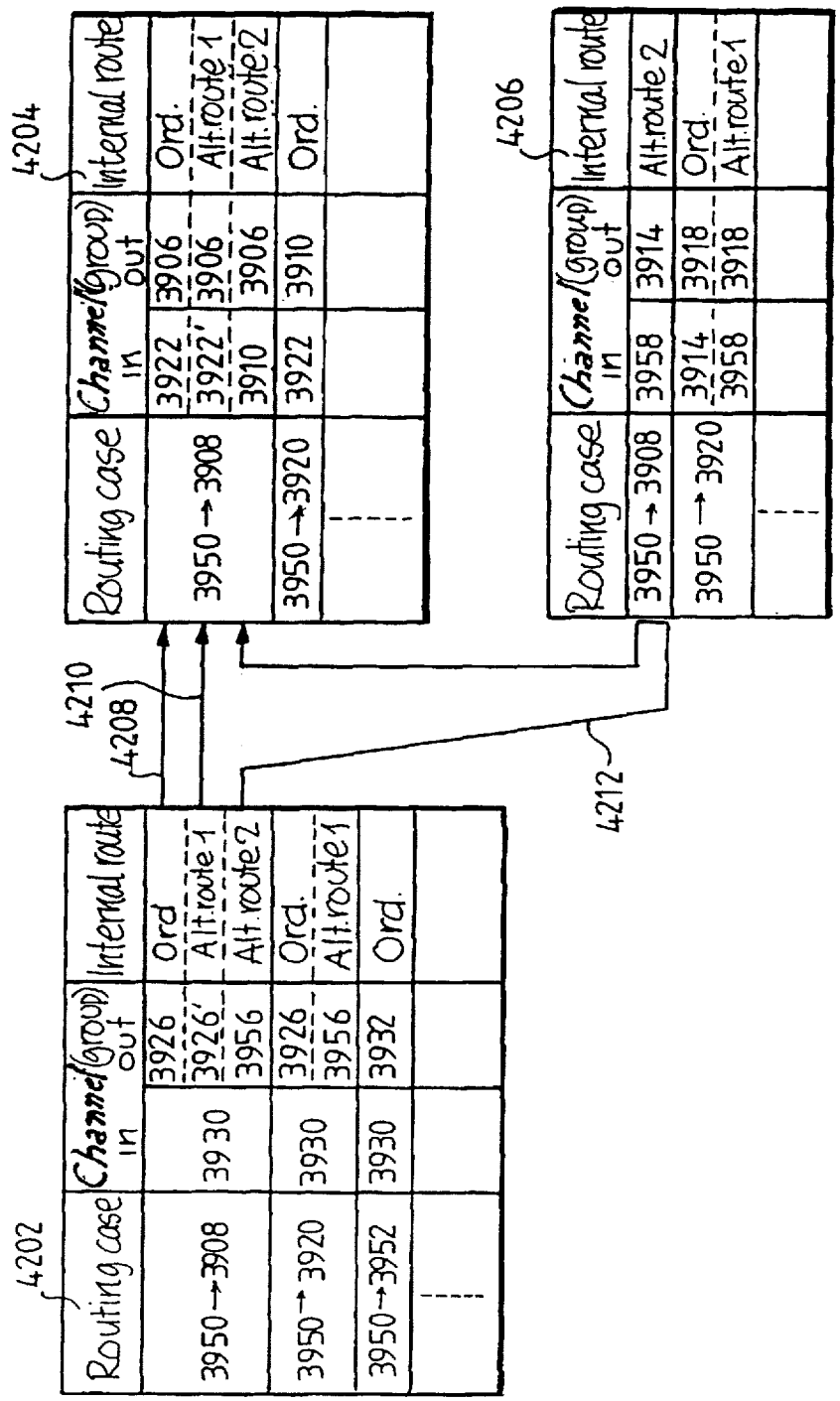
FIG. 42 shows a section of internal routing information for the network element according to FIG. 39 which is structured for each internal node.
Figure 43:
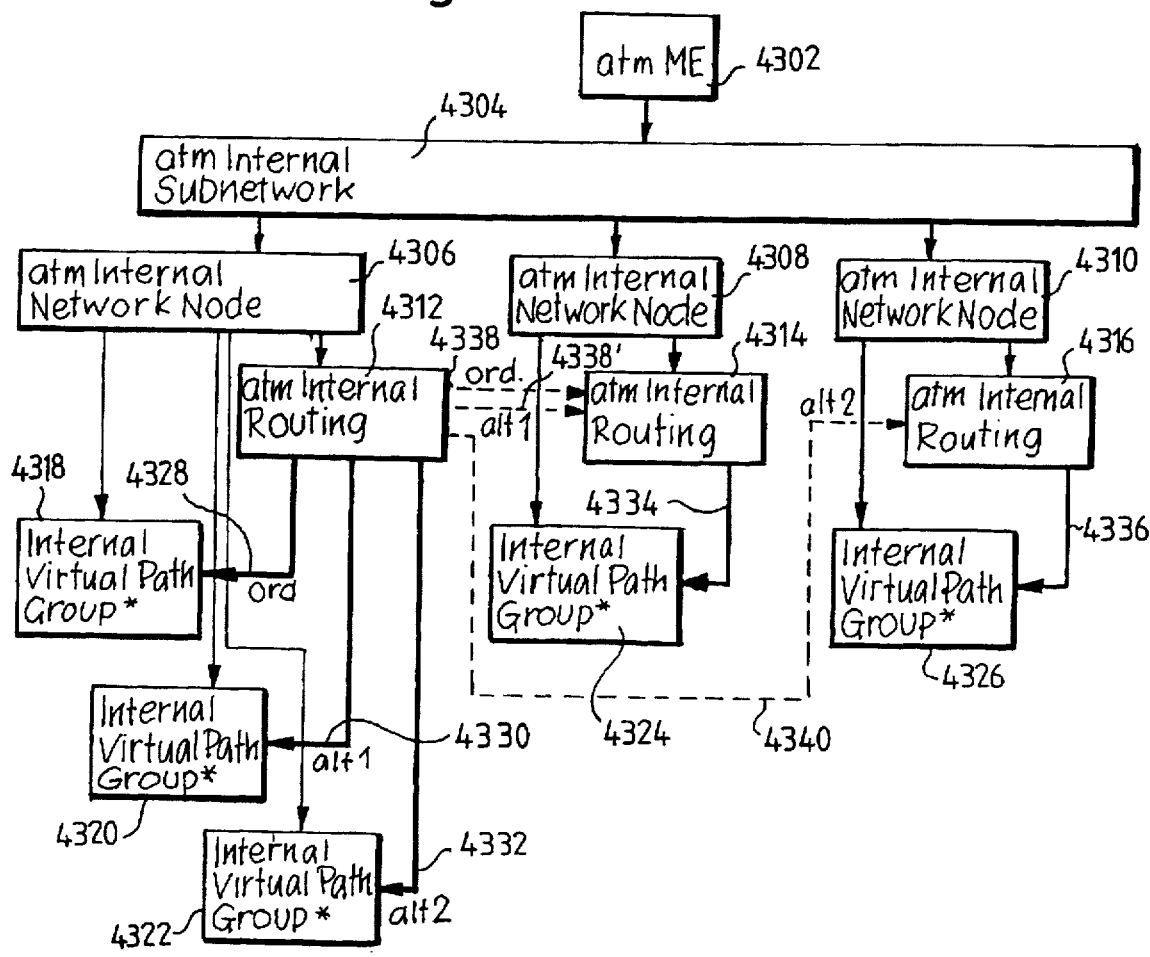
FIG. 43 shows a section of a managed object tree for internal routing of a routing case.

A "white box" view is used in case of local cases of operation, such as installation configuration, of e.g. internal connection routing, test of transmission links between nodes within the network element, set up of internal test connections, supervision with fault indication and fault statistics on such connections and transmission links, and supervision of internal traffic execution such as routing and resource allocation of ATM channels. The examples described below with reference to FIGS. 42 and 43 are based upon use of IBSN according to the invention. Several degrees of freedom exist in the configuration. The selection of these depend upon the specific requirements of the operator regarding possible cases of operation, as appears from FIG. 39.

In the reference configuration shown in FIG. 39 installation configuring of internal connection routing is required. The reason for this is that there are two alternative links 3924' and 3954, which besides the ordinary link 3924 make possible a first and a second alternative, respectively, for the connection between nodes 3926 and 3906. If these would not have been present such configuring would not be needed. It should be emphasized that this type of routing only relates to control along which internal route a connection between two connection terminating points, or groups, shall be established. There is thus carried through a simple 'route analysis' without i.a. 'number analysis' and 'signalling analysis', which have already been done on the call level. In the case of ATM the resource allocation of a channel on an internal ATM link can however be rather complicated. In FIG. 42 there is shown in table form a simplified example of how to perform the configuration principally by means of configuring possible route selections for each node. The tables 4202, 4204 and 4206 show different route selections or routing cases for the nodes 3928, 3904 and 3916, respectively. For the routing case user channel 3950→network channel 3908 described more closely below with reference to FIG. 43, arrows 4208, 4210 and 4212 have been introduced for indicating the ordinary route, the route according to alternative 1 and the route according to alternative 2, respectively. The internal output channels stated in the third column imply simplification. In real life groups of 'output channels' will most often be designated (in the case of ATM vc, groups of internal ATM vp links will be designated instead). Allocation of a single 'output channel' within a designated group is performed separately and this channel corresponds to a specific 'input channel' in the next node.

Possible routes over the internal network can be configured by 'linking together' the choice of route for each single node to a complete route description on network level, such as according to arrows 4208, 4210 and 4212. One important use of this description can be to be able to manage status information, e.g. fault information, for each route/network route and not only for each node and link. This can be used in many ways, e.g. to obtain status information for the connectivity through a certain subnetwork or adaptive control of internal routing on a network level. The description can either be realized as distributed for the route selection information for each node, as in FIG. 42, or centrally on a network level.

A section of a management tree for internal routing is shown in FIG. 43. In this case the operator has chosen only to configure one single subnetwork with a flat structure which does not contain any further subnetwork. More particularly there is described the routing case user channel 3950→network channel 3908 for the nodes 3928, 3904 and 3916, according to the tables 4202, 4204 and 4206, respectively, cf. FIG. 42.

As in earlier cases the root of the tree consists of an instance 4302 of the ATM specific managed object class atmME. This instance contains an instance 4304 of the class atmInternalSubnetwork which represents the subnetwork in question. The instance 4304 furthermore contains three instances 4306, 4308 and 4310 of the managed object class atmInternalNetworkNode which represent the nodes 3928, 3904 and 3916, respectively. The instances 4306, 4308 and 4310 each contain an instance 4312, 4314 and 4316, respectively, of the managed object class atmInternalRouting. The object InternalRouting within the IBSN fragment represents, as has been mentioned earlier, routing information for each node. The instance 4306 of atmInternalNetworkNode contains three instances 4318, 4320 and 4322 of an object class internalVirtualPathGroup, and the instances 4308 and 4310 of atmInternalNetworkNode contain each an instance 4324 and 4326, respectively, of the same class.

The instance 4312 of atmInternalRouting allocates according to arrow 4328 the instance 4318 of InternalVirtualPathGroup to represent the ordinary internal route between the internal channels 3930 and 3926 of the node 3928, which is included in the current routing case.

In the same way the instance 4312 of atmInternalRouting according to arrow 4330 allocates the instance 4320 of InternalVirtualPathGroup for representing the route between the internal channels 3930 and 3926'. This route is an alternative 1 for node 3928 in the current routing case.

In the same way the instance 4312 of atmInternalRouting according to arrow 4332 allocates the instance 4322 of InternalVirtualPathGroup to represent the route between the internal channels 3930 and 3956. This route is an alternative 2 for the node 3928 in the current routing case.

The instance 4314 of atmInternalRouting according to arrow 4334 allocates the instance 4324 of InternalVirtualPathGroup for representing, in the current routing case, the route of node 3904 between either one of the internal channels 3922 and 3922', on the one hand, and the internal channel 3906, on the other hand, i.e. ordinary route and the route according to alternative 1, respectively, in table 4204.

The instance 4316 of atmInternalRouting according to arrow 4336 allocates the instance 4326 of InternalVirtualPathGroup for representing, in the current routing case, the route according to alternative 2 in table 4206 between the internal channels 3958 and 3914 of the node 3916.

In FIG. 43 arrows 4338 and 4338' between the instances 4312 and 4314 furthermore indicate ordinary route according to channel 3924 and the alternative route 1 according to channel 3924' respectively, between the nodes 3928 and 3904 in the current routing case. The arrows 4338 and 4338' thus correspond to the arrows 4208 and 4210, respectively, in FIG. 42. The arrow 4340 between the instances 4312 and 4316 indicates the alternative route 2 via the node 3916 in the current routing case. The arrow 4340 thus corresponds to the route 4212 in FIG. 42.

Influence by internal distribution on the management information model for equipment in a network element will now be described more closely with reference to FIGS. 44 and 45.

Figure 44:
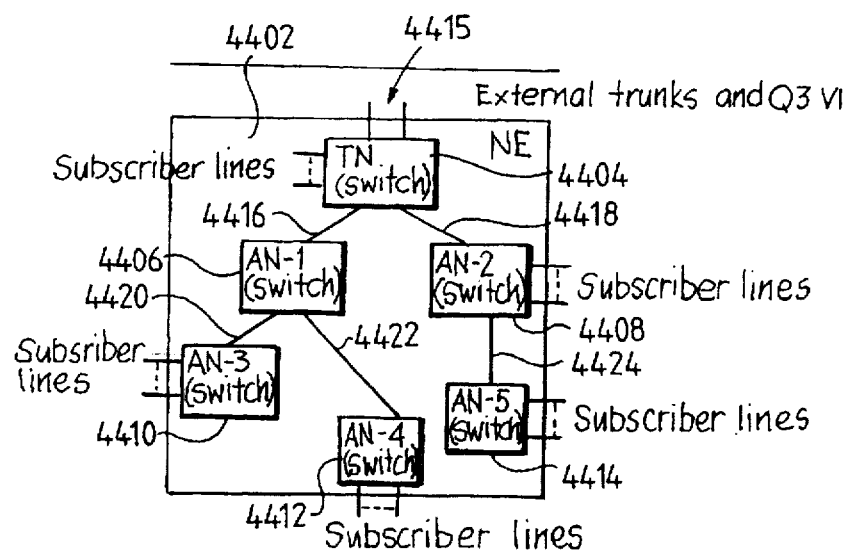
FIG. 44 shows a physical equipment view of a distributed local exchange.

As an example FIG. 44 relates to a distributed local exchange network element 4402 of a type similar to the one in FIG. 16. It consists of six internal nodes in different geographical locations, viz. one central switch/service node 4404, two remote switches/concentrator nodes 4406 and 4408, respectively, and three remote multiplexor nodes 4410, 4412 and 4414, respectively. The node 4404 has connections, indicated at 4415, to external links, not shown, and to an operations system, likewise not shown. The node 4404 is connected to the nodes 4406 and 4408 by means of links 4416 and 4418, respectively. The node 4406 is connected to the nodes 4410 and 4412 by means of links 4420 and 4422, respectively, and the node 4408 is connected to the node 4414 by means of a link 4424. To the nodes 4404, 4408, 4410, 4412 and 4414 subscriber lines are connected.

During installation, upgrade, alarm, repair of equipment resources (e.g. printed circuit cards, power units etc.) in a distributed network element it is necessary for the administrative staff of the system to obtain information of the physical location of the individual equipment resources. The management information model must in some way contain this information.

TMN standard recommendations (ITU-TS M.3100) specify that each equipment resource should be represented by a managed object of the class "Equipment", or a subclass thereof. This class of managed objects contains a location attribute "LocationName", which should include information relating to the physical location of the equipment resource. The standard, however, does not exactly state how to use the attribute. One model for how to carry through this will be described here with reference to FIG. 45.

Figure 45:
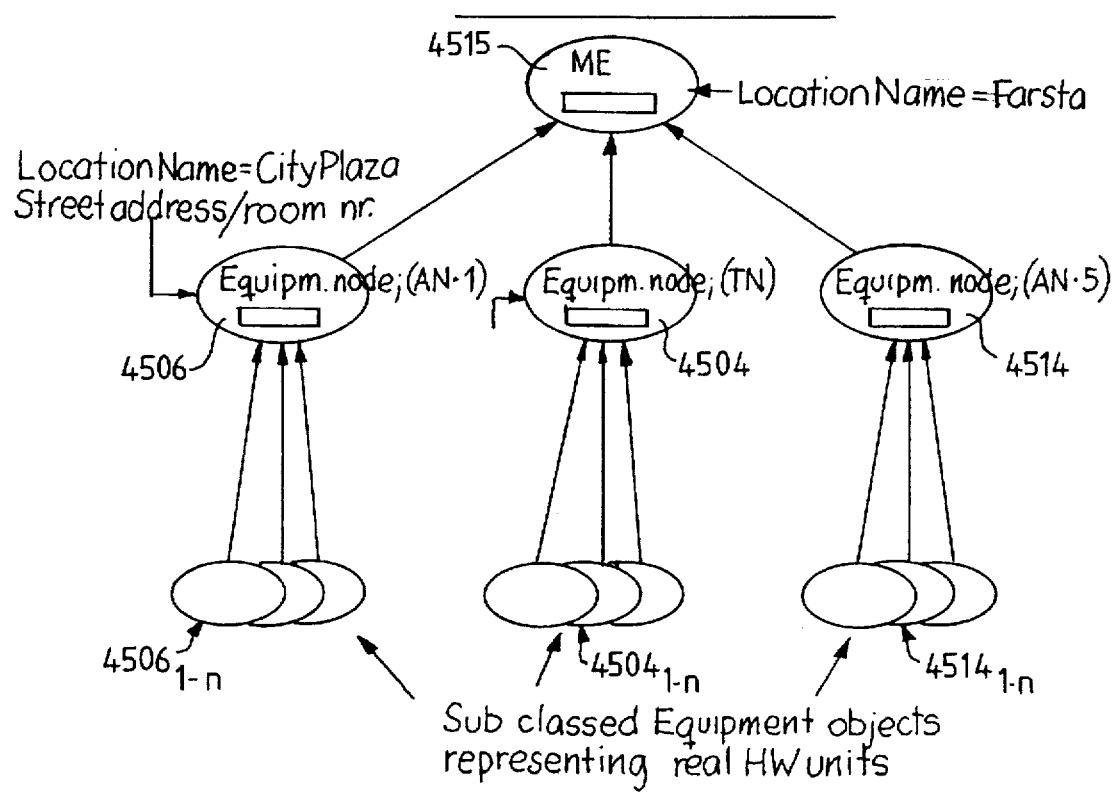
FIG. 45 shows a management information tree for the local exchange according to FIG. 44.

FIG. 45 illustrates a partial and simplified management information tree for the equipment resources of the network element shown in FIG. 44. More particularly, and for the sake of clearness, only objects 4504, 4506 and 4514 representing equipment resources belonging to the nodes 4404, 4406 and 4414 are included in the network element. Further objects, not shown, representing the nodes 4408, 4410 and 4412 are included in the management information tree in a corresponding way. With respect to the operations system a network element 4402 in the root of the management information tree is represented by an instance 4515 of a "naming" object class under the class ManagedElement.

The objects 4504, 4506 and 4514, as well as the other objects, not shown, each consists of an instance of a class "EquipmentNode" under the "naming" object class. Each such instance is common to hardware located in the same geographical position, i.e., in the example shown, in the respective node 4404–4414. This hardware consists of equipment resources such as cabinets, subracks and their plugged in printed circuit boards. Each object instance of "EquipmentNode" has a location attribute "LocationName", which is used for specifying the geographical location, e.g. street address, for the respective node.

Each equipment resource included in a node, such as nodes 4404–4414, is likewise represented by an instance of the object class "Equipment", which is naming associated with the object instance of the class "EquipmentNode", that represents the node in question. In the example according to FIG. 45 such instances are indicated for each one of the objects 4504, 4506 and 4514 at arrows $4504_{1-n}$, $4506_{1-n}$ and $4514_{1-n}$ respectively. The respective location attribute "LocationName" of these instances states the position for the respective resource in the node, in which the resource is located. Thus the location attributes for cabinet equipment objects specifies cabinet position (e.g. room, cabinet row etc.), the location attribute of subracks specifies position in the cabinet, and the location attribute of units plugged into subracks specifies position in a subrack. This hierarchical location information structure is then used for various management purposes.

For example, if one detects an equipment failure in a remote multiplexor, then an alarm event report of the type "Equipment alarm" will be created and sent from the network element to an operations system. From the alarm report the operator could read the attribute "LocationName" which is actually a concatenation of the information in the equipment model hierarchy and gives the needed location information.

A further example of services which are influenced by the system internal distribution from the point of view of management, are such required for managing the distributed data processing system in the network element. Particularly influenced are such functions that provide communication between programs (processes) in different processors.

Let us for the purpose of illustration assume that all processors in the system use the atm bearer service for mutual communication. Routing information specific to the communication between processors must then be defined and channels in atm switch networks and on atm links must be reserved for communication between processors.

There is therefore needed a management fragment for the internal communication network between processors. In this fragment the different processors can each be represented by a managed object containing information relating to the address of the system internal atm termination point to which it is connected. This information can e.g. be implemented as a relation attribute that refers to a system internal managed object for an atm network terminating point. From this communication address information the data processing system at start and at configuration changes can calculate routing tables and decide on which atm channels establishing shall be performed in the internal atm bearer network.

We claim:

1. A telecommunications system comprising:
   a network of elements providing functions to enable communications between elements; each element including resources of hardware and software that are used to perform the functions, the software including objects representing the resources;
   at least one operations system for performing the functions, in addition to setting up calls, having means for managing the resources according to a first management information model using the objects, wherein the elements offer the operations system a standardized service specific "black box" view of only the parts of the resources that are available and needed for communication between the elements and connected subscribers,
   wherein at least one element includes several nodes, forming part of an internal system of the element, for providing functions in an internal bearer network service, and internal resources hardware and software for performing internal functions, the internal software including objects representing the internal resources and
   the at least one element offers an operations system a "white box" view, wherein the internal resources are available to the operations system to manage the internal resources using the objects according to a second management information model, when using internal resources to perform the internal functions,
   wherein the second management information model is implemented as an addition to the first management model and
   a management information tree, based upon the second management information model, has in its root a managed object which is also used for management according to the first information model, and a management information tree, based upon the second management information model, has in its root a managed object which is also used for management according to the first information model.

2. A network element according to claim 1, wherein the root object is of a standard class specific to a transport network standard that can be used in the "black box" view.

3. A network element according to claim 1, wherein the root object contains an internal network specific managed object that supports network layering in the internal network.

4. A network element according to claim 1, wherein the root object contains an internal network specific managed object that supports network partition in the internal network and represents a subnetwork allowing partitioning into further subnetworks.

5. A network element according to claim 1, wherein the root object is of a class specifically used for management according to the second management information model.

6. A network element according to claim 5, wherein the object supporting network layering contains an internal network specific managed object that supports network partitioning in the internal network and represents a subnetwork allowing partitioning into further subnetworks.

7. A network element according to claim 5, wherein the object supporting network layering contains an internal network specific object representing a standard type trail.

8. A network element according to claim 5, wherein the object representing a partitionable subnetwork contains an internal network specific object representing a connection between termination points within subnetworks in the internal network.

9. A network element according to claim 5, wherein the object representing a partitionable subnetwork contains an internal network specific object representing a link connection in the internal network.

10. A network element according to claim 5, wherein the object representing a partitionable subnetwork contains an internal network specific object representing a non-partitionable subnetwork in the internal network.

11. A network element according to claim 10, wherein the object representing a non-partitionable subnetwork contains an object representing an occurrence of an object of standard class representing a termination point.

12. A network element according to claim 10, wherein the object representing a non-partitionable subnetwork contains an internal network specific object representing routing information for the non-partitionable subnetworks.

13. A network element according to claim 10, wherein the object representing a non-partitionable subnetwork contains an internal network specific object representing a logical grouping of circuit termination points in the internal switched network.

14. A network element according to claim 10, wherein the object representing a non-partitionable subnetwork contains an internal network specific object representing a function to allocate ATM vc channels having a certain bandwidth on a given group of ATM vp links in the internal switched network.

15. A network element according to claim 10, wherein the object representing a non-partitionable subnetwork contains an internal network specific object representing a crossconnect functionality for the non-partitionable subnetwork.

16. A network element according to claim 15, wherein the object representing a crossconnect functionality contains an internal network specific object representing a crossconnection between two termination points in a non-partitionable subnetwork.

17. A network element according to claim 15, wherein the object representing a crossconnect functionality contains an internal network specific object representing a logical grouping of transport termination points in the internal transport network.

18. A network element according to claim 15, wherein the object representing a crossconnect functionality contains an internal network specific object representing a function to allocate ATM vc channels having a certain bandwidth on a given group of ATM vp links in the internal transport network.

* * * * *